US012496521B2

(12) United States Patent
Carmichael et al.

(10) Patent No.: US 12,496,521 B2
(45) Date of Patent: Dec. 16, 2025

(54) CONTROLLING A USER INTERFACE OF A COMPUTER DEVICE

(71) Applicant: KING.COM LTD., St. Julians (MT)

(72) Inventors: Alexandra Carmichael, Stockholm (SE); Kyle Bardiau, Stockholm (SE); Susanne Sturesson, Farsta (SE)

(73) Assignee: KING.COM LIMITED, St. Julians (MT)

( * ) Notice: Subject to any disclaimer, the term of this patent is extended or adjusted under 35 U.S.C. 154(b) by 309 days.

(21) Appl. No.: 18/120,635

(22) Filed: Mar. 13, 2023

(65) Prior Publication Data

US 2024/0307777 A1 Sep. 19, 2024

(51) Int. Cl.
*A63F 13/537* (2014.01)
*A63F 13/55* (2014.01)
*A63F 13/69* (2014.01)
*A63F 13/2145* (2014.01)

(52) U.S. Cl.
CPC ............ *A63F 13/537* (2014.09); *A63F 13/55* (2014.09); *A63F 13/69* (2014.09); *A63F 13/2145* (2014.09)

(58) Field of Classification Search
None
See application file for complete search history.

(56) References Cited

U.S. PATENT DOCUMENTS

2021/0260480 A1* 8/2021 Afram .................... A63F 13/80

OTHER PUBLICATIONS

YouTube video "Candy Crush Soda Saga Chocolate Levels"—https://www.youtube.com/watch?v=_2G1X173ia4 to Pete Peppers, Nov. 4, 2014 (Year: 2014).*
YouTube video "Introduction to Crystal Candies, Level 4596"—https://www.youtube.com/watch?v=b_oBwvxYiS8 to Suzy Fuller, Apr. 24, 2019 (Year: 2019).*

* cited by examiner

*Primary Examiner* — Damon J Pierce
(74) *Attorney, Agent, or Firm* — Holzer Patel Drennan

(57) ABSTRACT

This application relates to a computer device configured to provide a computer game. The computer device displays an initial gameboard of a computer game and displays at least one special game element on the gameboard. A processor detects a qualifying action that affects the special game element, and activates the special game element. Activating the special game element causes assignment of a special 'collectable' element attribute to at least one element supported by a tile with the special tile attribute. If the processor detects a second qualifying action relating to a collectable element, a count is incremented for each collectable element to which the second qualifying action relates.

23 Claims, 18 Drawing Sheets

1019

1023

| Element | Element Code | Eligible for collectable attribute? | |
|---|---|---|---|
| Red Candy | 001 | TRUE | ... |
| Orange Candy | 002 | TRUE | |
| Blue Soda Bottle | 003 | FALSE | |
| Container | 004 | FALSE | |
| Green Striped Booster | 005 | FALSE | |
| ⋮ | | | |

Figure 10b

1025

1029

| Encasement Type | Encasement Code | Initial Layers |
|---|---|---|
| Standard lock | E01 | 1 |
| Candy Wraper | E02 | 1 |
| 4-Layer Bubblegum | E03 | 1 |
| 5-Layer Bubblegum | E04 | 5 |
| 6-Layer Ice | E05 | 6 |
| ⋮ | | |

...

Figure 10c

CONTROLLING A USER INTERFACE OF A COMPUTER DEVICE

FIELD OF THE INVENTION

The present invention relates to controlling a user interface responsive to user engagement with displayed elements on the interface of a computer device.

BACKGROUND OF THE INVENTION

In the field of computer-implemented games, there are many technical challenges facing the designer of such games when considering how the user interface is to be controlled in the context of computer devices available to play the game.

A particular challenge is that of user engagement. Engagement involves designing gameplay to be engaging and rewarding to players. This typically requires games to be easily understood at their simplest or introductory levels, providing rewarding gameplay with quite simple game mechanics, but becoming progressively more challenging so that players are not bored, but remain engaged and develop rewarding skills. Effective engagement requires various forms of feedback to reinforce player sense of success and accomplishment.

An existing type of match-three game is a so-called "switcher" game. A match-three game is a type of casual puzzle game where the player is required to find patterns on a seemingly chaotic game board comprising tiles supporting user selectable game elements. The player then has to match three or more of the same type of game element on the game board and those matched elements then disappear. In a switcher game, the player switches place of adjacent game elements on the game board so that one or both of them create a chain of at least three adjacent game elements of the same type. Those matched game elements then disappear. The game board is then repopulated with game objects.

Another existing game-type is a "clicker game." A "clicker game" is a type of casual puzzle game where the player is required to find patterns on a seemingly chaotic board. The player then has to match two or more of the same type of game element on the game board and those matched elements are then removed from the board. The player matches adjacent game elements of the same type by selecting one or more of the game elements in a group of matching elements.

A further existing game-type is a "linker game." In this game, the user aims to remove game elements from the gameboard by linking groups of three or more matching elements. The user can select the elements to link by, for example, dragging their finger over the elements on a touch screen and then releasing their finger to select the linked element. Alternatively, the user may click on the elements they wish to link and then actively select a completion button to trigger their selection.

In games of the above type of game mechanic, certain game elements are provided on tiles which have additional properties compared with "normal" game elements which can be switched (clicked/linked) and are then removed. Such game elements are often referred to as booster game elements (or simply 'boosters') because they enhance game play, for example they may be triggered, and when triggered they remove additional game elements from the game board according to different removal policies associated with different booster game elements. Booster elements include for example line blasters, column blasters, bombs, fish etc.

The game also implements several different kinds of so called "blockers". Blockers (also referred to herein as blocking elements) are game elements that are in the way for the player when wanting to make matches on different areas of the gameboard. Blocking elements are unresponsive to direct user engagement, but may be removed in certain conditions. Blocking elements may be removed by making a match adjacent a blocking element, or by the action of a booster game element which has been triggered.

Some blocking elements may be multi-layer blocking elements. These blockers have a predefined number of layers which the user has to remove in order to remove the whole blocker from its supporting tile. A single layer is removed from the multi-layer blocker when a match-3 condition is satisfied adjacent to the multi-layer blocker, or when a triggered booster element acts on the blocker. For such blockers, the blocking element is only removed fully when the final layer of the blocker is removed from the gameboard, when a blocking element removal condition is satisfied.

The blocking element removal condition may be satisfied if the blocking element comprises a last layer of a multilayer blocking element, the other layers of the blocking element having previously been removed from the gameboard in one or more prior blocking element layer removal condition.

Some blocking elements may be unresponsive to element matches and other events that would otherwise cause removal of an element or a layer thereof from a gameboard. Such blockers may also be referred to herein as indestructible walls, or non-removable walls.

Layer conditions may also be applied to game elements which, by default, do not have more than one layer. That is, so called 'casing' attributes may be assigned to a tile which have the effect of adding one or more layer to an element within that tile. By way of example, casing attributes may be visually indicated by a graphic representation of a cage, box, or container.

This patent specification describes not only various ideas and functions, but also their creative expression. A portion of the disclosure of this patent document therefore contains material to which a claim for copyright is made and notice is hereby given: Copyright King.com Limited 2019 (pursuant to 17 U.S.C. 401). A claim to copyright protection is made to all screen shots, icons, look and feel and all other protectable expression associated with the games illustrated and described in this patent specification.

The copyright owner has no objection to the facsimile reproduction by anyone of the patent document or the patent disclosure, as it appears in the Patent and Trademark Office patent file or records, but reserves all other copyright rights whatsoever. No express or implied license under any copyright whatsoever is therefore granted.

Certain computer devices are configured to provide a user interface and underlying program which provides for 'spreading' mechanics. According to these mechanics, tiles may acquire an attained appearance which distinguishes them from a normal appearance of a tile. Certain games have an objective to 'spread' the attained background appearance over tiles, responsive to a user implementing the matching/linking game mechanic. One example of this is described in U.S. Pat. No. 9,776,093.

In another example, special regions or segments of tiles on a gameboard may be provided upon satisfaction of a first condition. The special tile segment, once activated may be configured to provide an increased probability of generating a booster element when an element match is made at least partially within the special region. Such a feature is described in U.S. patent application Ser. No. 17/333,550.

SUMMARY OF THE INVENTION

Aspects of the present invention provide improved methods of controlling a user interface in the context of a computer-implemented game of the match three game-type. They provide a solution to the technical problem of user engagement with a limited screen resource and/or improve user engagement.

In particular, a new type of game objective is provided to a player which is visually engaging.

According to a first aspect of the invention there is provided a computer device having:

- a user interface comprising a display which is configured to display an initial gameboard of a computer game comprising a plurality of tiles, each tile supporting a respective user actuatable game element and a user input detection component configured to detect user input of a user move when a user engages with one of the user actuatable game elements, the display further configured to display at least one special game element on the gameboard;
- a processor configured to receive the detected user input of the user move and to detect a first qualifying action affecting the special game element and to determine when a qualifying condition has been satisfied;
- the processor further configured on determining that the qualifying condition has been satisfied to activate the special game element, wherein activating the special game element causes the processor to assign to at least one game element supported by the at least one tile a special element attribute which denotes the at least one game element with the assigned special element attribute as a collectable element;
- the user input detection component further configured to detect a user input which satisfies a second qualifying action relating to the collectable element and wherein the processor is configured to increment a count for each collectable element to which a qualifying action relates.

In some embodiments, the computer device comprises a computer store holding level data, wherein the tiles are arranged at gameboard locations defined in a gameboard layout in the level data.

In some embodiments, the gameboard comprises first and second regions, wherein first tiles of the first region have a first quality and second tiles of the second region have a second quality, wherein the special game element is activatable only in the first region and not in the second region.

In some embodiments, the processor is configured responsive to the detected user input of the user move to detect a match game condition of at least three adjacent matching user actuatable game elements and to control the user interface to remove the at least three game elements from the display and provide on the display replacement user actuatable game elements. In such an embodiment, the processor may be configured to detect the match game condition adjacent the special game element, and to determine a first qualifying action based on that detection.

In some embodiments, the processor is configured to detect the match game condition adjacent a collectable element and to determine the second qualifying action based on the detection.

In some embodiments, the processor is configured to detect an interacting event which is created by game code executed by the processor which generates a direct interaction with the special game element and to thereby determine the first qualifying action.

In some embodiments, the processor is configured to detect an interacting event which is created by game code executed by the processor which generates a direct interaction with the collectable element and to thereby determine a second qualifying action.

In some embodiments, the processor is configured responsive to detected user input of the user move to detect a match game condition of at least three adjacent matching user actuatable game elements and to control the user interface to remove the at least three game elements from the display and provide on the display replacement user actuatable game elements, wherein the different qualities of the first and second tiles define different physics with which the replacement user actuatable elements are provided on the display.

In some embodiments, the computer device comprises a visual indicator, which separates the first and second regions on the display.

In some embodiments, the special game element comprises multiple layers and the processor is configured to remove one layer for each first qualifying action, and to determine a qualifying condition where all layers have been removed.

In some embodiments, the processor is configured to render different visual indications of the special game element on removal of each layer.

In some embodiments, the processor is configured to allocate a special tile attribute to one or more tiles to form one or more special region, wherein each special region comprises one or more tile having the special tile attribute.

In some embodiments, the processor is configured to allocate the special tile attribute to the at least one tile which supported the special game element which was activated by determination of the qualifying condition.

In some embodiments, the processor is configured to render the special game element in the first region with a first visual appearance and a second special game element in the second region with a different visual appearance, the visual appearance indicating to a user that the first special game element in the first region is activatable, and the second game element in the second region is not activatable.

In some embodiments, the processor is configured to detect that a game objective has been completed for a particular game level when the count assigned to the number of collectable elements reaches a predetermined count threshold.

In some embodiments, the processor is configured to detect that the user input has switched a collectable game element with an adjacent user actuatable game element to form a match game condition, and wherein the processor is configured to remove the special element attribute from the collectible game element if it is no longer supported by a tile having the special tile attribute.

In some embodiments, the processor is configured to allocate the special tile attribute to multiple tiles when the special game element is activated, and wherein the processor is further configured to remove the special tile attribute from a subset of the number of tiles after a predetermined number of game moves by the user.

In some embodiments, the processor is configured to detect that one or more game element is no longer is supported by a tile having a special tile attribute and to remove the special element attribute from that one or more game element.

In some embodiments, the computer device comprises a computer store holding a data structure which holds tile data for each of the plurality of tiles supporting the game elements, the tile data indicating special tile attributes for the one or more tile, and game element data indicating the properties of the game elements and including the special element attribute assigned to the one or more game element.

In some embodiments, the computer device comprises a rendering engine configured to access the data structure to render tiles and game elements on a next gameboard after each user move.

According to a second aspect of the invention there is provided a computer-implemented method of providing a computer game responsive to user inputs, the method comprising:

- displaying an initial gameboard of a computer game comprising a plurality of tiles, each tile supporting a respective user actuatable game element;
- receiving a detected user input of a user move when a user engages with one of the user actuatable game elements;
- detecting a first qualifying action affecting a special game element on the gameboard;
- in response to determining that the qualifying condition has been satisfied, activating the special game element, wherein activating the special game element causes assignment to at least one game element supported by the at least one tile a special element attribute, which denotes the at least one game element with the assigned special element attribute as a collectable element;
- detecting a user input which satisfies a second qualifying action relating to the collectable element; and
- incrementing a count for each collectable element to which a qualifying action relates.

According to a third aspect of the invention there is provided a non-transitory computer-readable medium on which are stored computer readable instructions which when executed by a processor of a computer device cause the processor to implement a method according to the second aspect of the invention, described above.

BRIEF DESCRIPTION OF DRAWINGS

For a better understanding of the present invention and to show how the same may be carried into effect, reference will now be made by way of example to the accompanying drawings in which:

FIG. 10*b* shows an exemplary element database storing attributes of all elements that may be provided on a gameboard.

FIG. 10*c* shows an exemplary encasement database storing attributes of all encasement types that may be provided on a gameboard.

It will be appreciated that where reference numerals of the form xxx-a, xxx-b etc., are used to denote a particular instance of a feature of the drawing, the same reference numeral without a specified letter may denote a generic instance of the same feature.

DETAILED DESCRIPTION OF THE INVENTION

The present disclosure provides a computer device configured to provide a game to a user and, in particular, to provide a visually engaging special game objective comprising special game elements in the context of a matching game, such a switcher, clicker or linker The special game element may be referred to herein as a 'container' element, or a 'mint' element. Certain game elements may be triggered by activation of the special game element to acquire a special element attribute referred to as the collectable attribute, and become 'collectable elements'. Collectable elements are made visually distinct from other game elements, so they are readily identifiable by a user. A novel game objective is to collect the collectable elements. In certain embodiments, collectable elements may lose their collectable status as more game moves are made, testing the skill of a player In some embodiments, special tile attributes are allocated to one or more tile. A tile having the special tile attribute may be described as having a 'foam attribute', and tiles with the foam attribute may be said to be included as part of a 'foam region'. The foam region seen in some embodiments may be made visually distinct from the rest of the gameboard. The special game element can cause the 'foam' to be allocated to certain tiles, by which the game elements on those tiles become "collectable".

The game has a gameboard with gameboard locations at which tiles are located. The status of game board locations is defined in a gameboard layout, which may be for example part of level data for a game level stored in computer memory.

The terms 'user' and 'player' are used interchangeably throughout this document and no specific meaning is intended using one or the other unless the context suggests otherwise.

Figure 1:
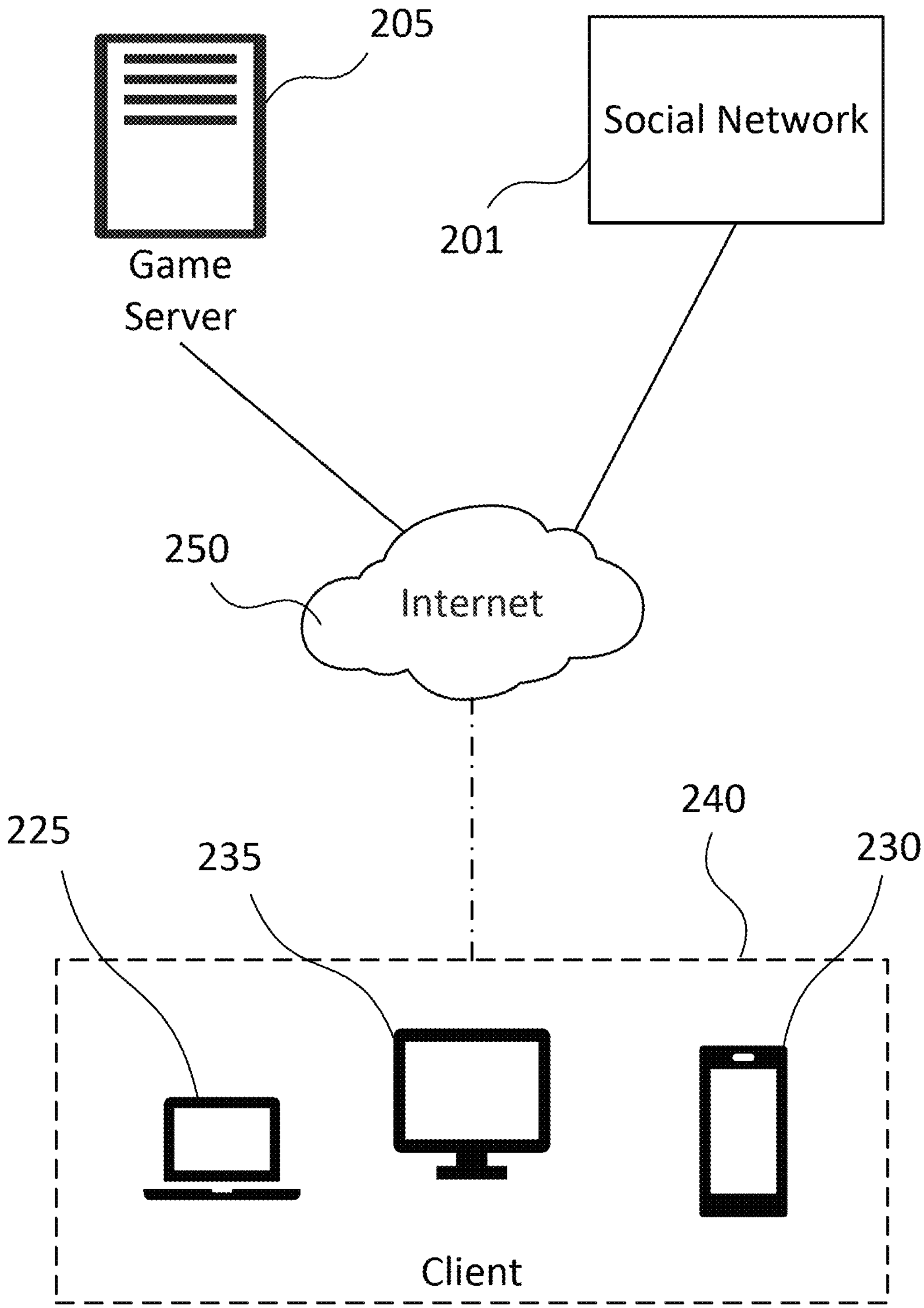
FIG. 1 shows a highly schematic diagram of a computer system architecture.

FIG. 1 portrays an exemplary overall environment in which the computer device of the present invention can be utilized as a client device. A virtual game is stored on, for instance, a game server 205. The virtual game is to be played on the client device 240, such as a computer 235, 225 or a smartphone or other handheld device 230. The client device 240 can also be a kiosk, arcade gaming station, smart TV or other device with computing capabilities, input devices, and a screen that can present the game to a user. The client device communicates with the game server 205 and a social network server 201, for instance through the Internet 250 or other network. It should be understood that the social network server 201 and the game server 205 do not have to be located in different places, they could be on the same server or on a plurality of servers located in different locations. People skilled in the art will understand that other devices than the exemplary ones listed can also be used without departing from the scope of the invention.

The computer device may have a user interface allowing a user to interact with it in different ways depending on the capabilities of the client device 240 which the user is accessing the game with. A user can interact with the game through using a touch screen where the user can select and/or move elements on the game board with a finger or for instance with a stylus. The game can also be played with a pointing device such as a mouse or other interaction devices such as keyboard while the game is displayed to a user on a separate display of the user interface.

Mobile devices may have a touch screen interface where the player can interact with the game using a finger or a pointing device such as a stylus. Some mobile devices have hard keys that complement the touch screen interface. Such hard keys may be in the form of a button or in the form of a joystick type of interaction.

Figure 2:
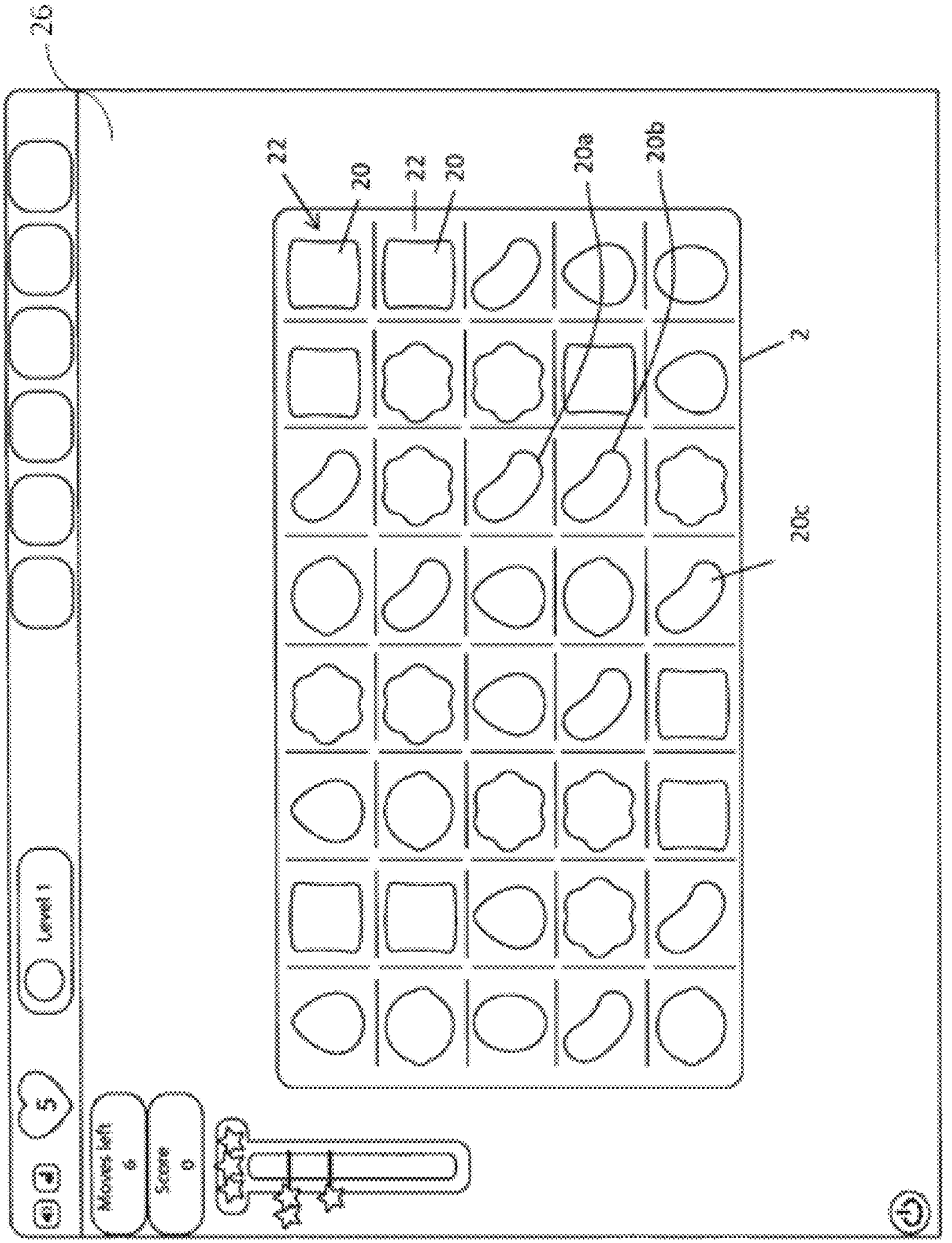
FIG. 2 is a graphical representation of a level in the Candy Crush game.

FIG. 2 shows a display of a known version of a match 3 switcher game called Candy Crush Saga™. FIG. 2 illustrates a game board 2 with a plurality of game elements 20 provided on a user interface 26 of a computer device. The game elements are each of six different shapes and colours. Each game element is supported by a tile 22. In some embodiments, the tiles are not readily visible to a player of the game—the game elements are the main focus for a player. However, the tiles govern characteristics of the game elements which are visible to a player as will be described in more detail later.

Figure 3:
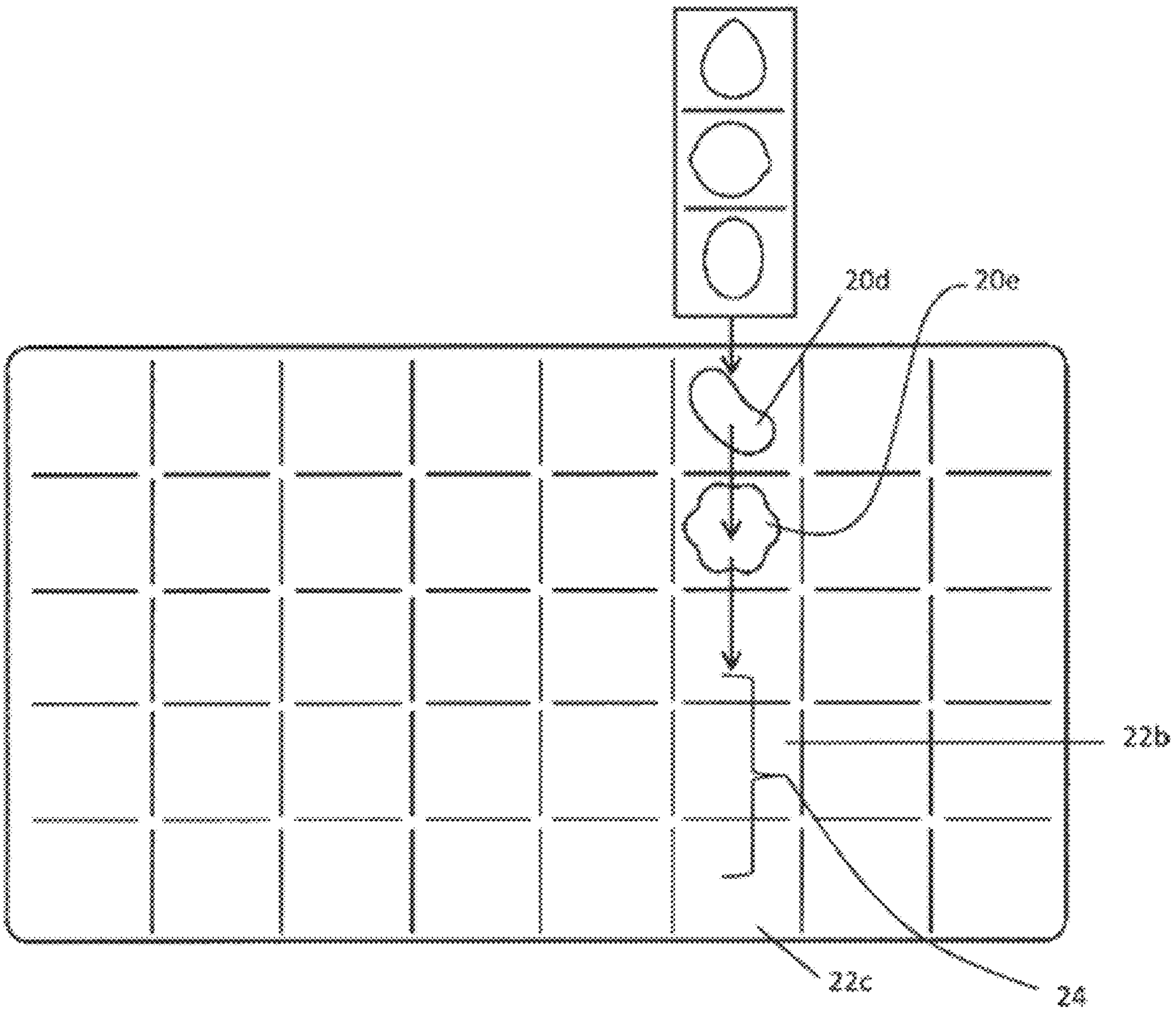
FIG. 3 shows a graphical representation of an exemplary gameboard, demonstrating a refill procedure.

In the known version of the match 3 switcher game, the aim of the game is to swap game elements in the shape of candies with each other to make moves on the game board. To gain points the player has to make moves that create matches of at least three of the same candy. In doing so, the player gains points and the matched candies are removed. As a result, new candies are generated to fill any vacancies created. New candies may for example appear to fall in place from the top of the gameboard, but other effects are possible. Assume in FIG. 2 that game element 20*c* is moved one place to the right to form a three-line match with game elements 20*a* and 20*b*. Turning now to FIG. 3, this has the effect of game board elements 20*a*, 20*b* and 20*c* “disappearing”, creating a visual effect (animation) on the screen to indicate the disappearance, such as a minimal explosion effect denoted 24 in FIG. 3. The two game elements which were directly above game elements 20*a* will now fall downwards into the spaces created by the removal of game elements 20*a*, 20*b* and 20*c*. Thus, game element 20*e* will end up at the location of tile 22*c*, and game element 20*d* will end up at the location of tile 22*b*. In addition, three new game elements are generated and fall into the game board to fill the remaining three tiles above tile 22*b* according to the ‘physics’ of the refill, in this case downwards. In existing games, the newly generated game elements may be generated at random. The user then has a new game board on which to play a subsequent move. Game elements may be of different types, and may include so-called booster game elements which enhance game play for a user. As explained more fully herein, the present disclosure relates to a computer device which is configured to provide a new visually engaging game objective for a player engaging with such a user interface.

The computer device and its operating modes described herein can be deployed in many different gameplay architectures. For example, a computer device can be configured by a computer game executed on the device. The game may be implemented as a computer program (e.g., game code) that is stored locally in the memory of a PC, games console, tablet or mobile telephone or other computing device. The game can be implemented as a computer program that is stored and runs entirely on one of many processors in a remote server, and data streams or updates are supplied to the client device (e.g., tablet, smartphone, etc.) to enable the client to render and display graphics and sounds.

Another possible infrastructure is a hybrid one, in which back-end servers handle some elements of the gameplay, and for instance a Java game applet is provided to client devices, and it is the locally running Java applet that configures the client device to generate the graphics/sounds/user interaction for gameplay on the player’s client device. Some data may be fed back to the back-end servers to enable scoring, interaction with other players and cross-platform synchronisation.

In implementations where some or all elements of game code are executed on a remote server, users may be able to share their gaming experiences with other users. They may, for example, be able to share the scores they have achieved in a level with other players, which may be used to generate a leader board. Users may be able to choose which other users to share their scores with, for example their friends on a social media platform such as Facebook. This gives a social aspect to the game.

Figure 4:
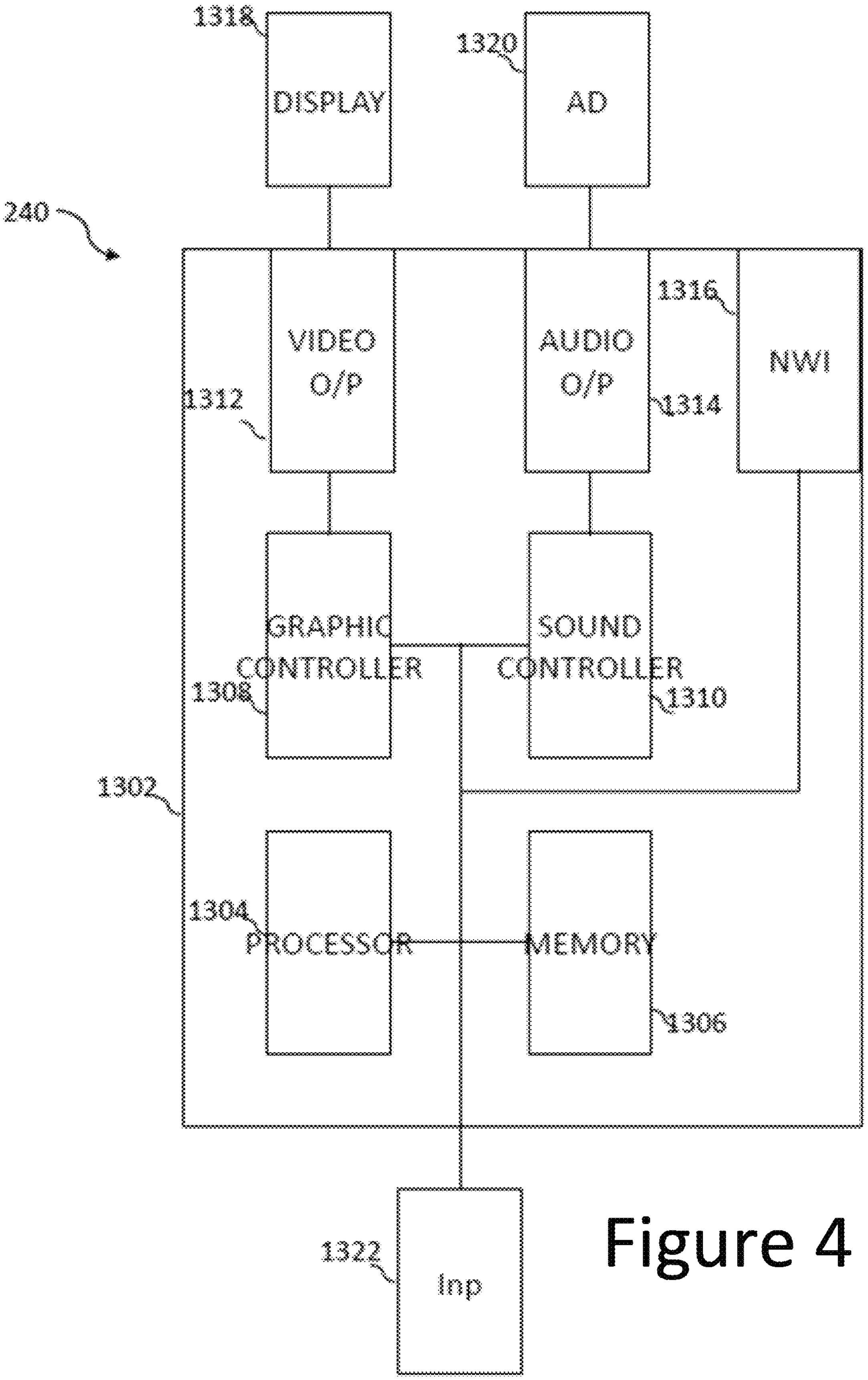
FIG. 4 shows a highly schematic diagram of a computing device.

A schematic view of the user or computing device 240 according to an embodiment is shown in FIG. 4. The user device has a controller 1302. The controller 1302 may have one or more processors 1304 and one or more memories 1306. The controller 1302 is also shown as having a graphics controller 1308 and a sound controller 1310. It should be appreciated that one or other or both of the graphics controller 1308 and sound controller 1310 may be provided by the one or more processors 1304. Other functional components may also be implemented by suitable circuitry or computer code executed by the one or more processor 1304.

The graphics controller 1308 is configured to provide a video output 1312. The sound controller 1310 is configured to provide an audio output 1314. The controller 1302 has a network interface 1316 allowing the device to be able to communicate with a network such as the Internet 250 or other communication infrastructure.

The video output 1312 may be provided to a display 1318. The audio output 1314 may be provided to an audio device 1320 such as a speaker and/or earphones(s).

The device 240 may have an input device 1322. The input device 1322 can take any suitable format such as one or more of: a keyboard, mouse, touch screen, joystick or game controller. It should be appreciated that the display 1318 may in some embodiments also provide the input device 1322, for example, by way of an integrated touch screen.

The functional components of the controller 1302 are configured to communicate with each other via an interconnect such as a bus or any other suitable interconnect and/or by point-to-point communication.

It should be appreciated that, in some embodiments, the controller 1320 may be implemented by one or more circuits, at least in part. It should be appreciated that embodiments may be deployed in different system architectures. For example, the computer device may be configured by a computer game that is stored in the memory 1306 of the user device 240. However, when online, the server 205 may handle some elements of the game in some embodiments, as previously described.

In some embodiments, a computer game may be implemented as a computer program that is stored in a memory system, for example the server 205, and which runs on the processor of the game server. Data streams or updates are supplied to the client device 240 to allow the user device 240 to render and display graphics and sounds in a browser of the client device 240.

Soda Level Overview

Figure 5A:
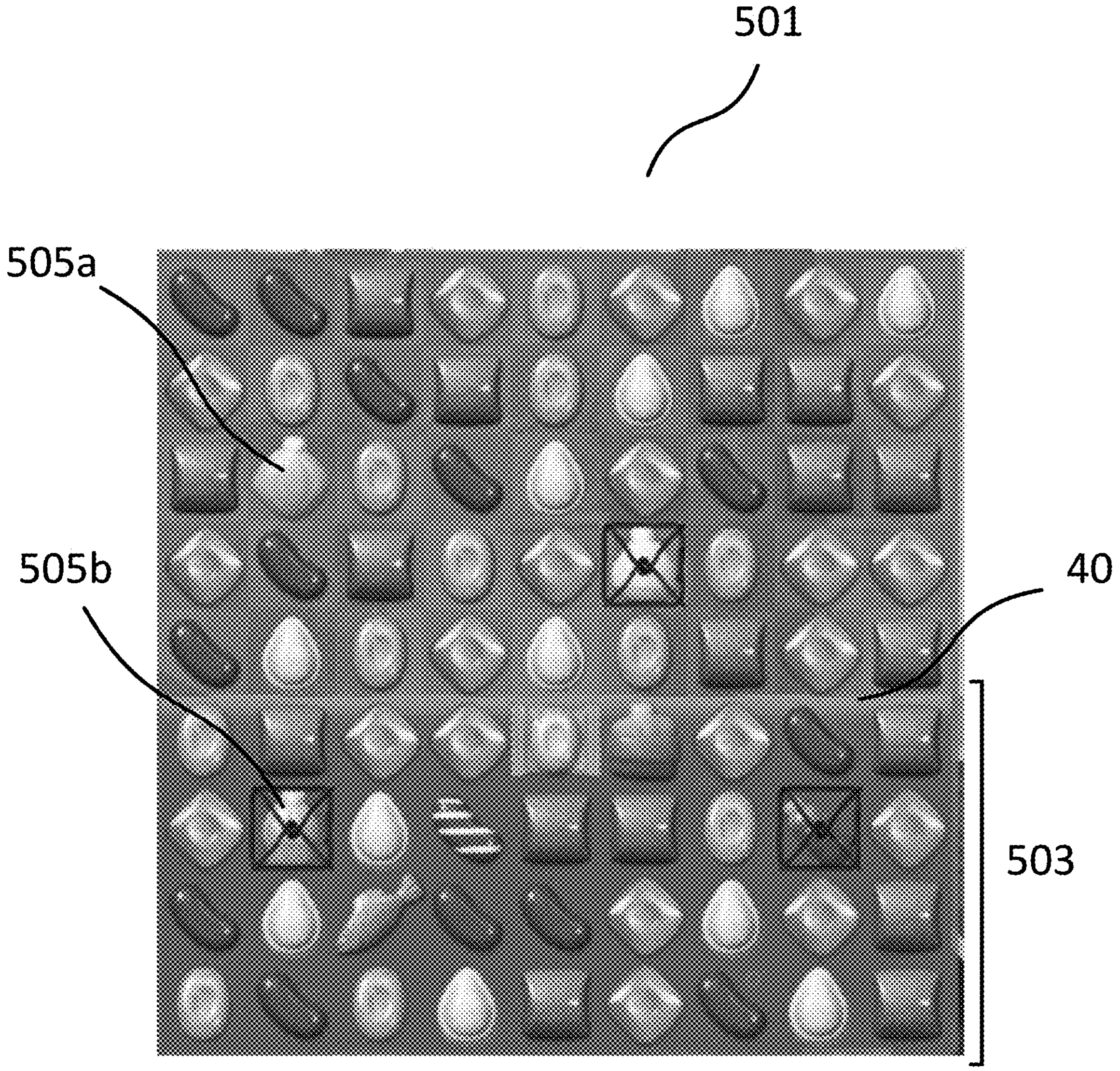
FIG. 5*a* shows a first exemplary gameboard of a switcher game level implementing a soda feature.

In some embodiments of the game, the physics of each individual tile can be altered based on the game play of a user, or based on an instruction from the game software. Both the speed at which the tile can move, and the direction in which it can move can be governed by play of the game. FIG. 5 illustrates a game board 501 of one embodiment of a switcher game. The game board 501 has two regions which are divided by a dividing line 40. In the upper section, the game mechanic is as just described with respect to FIG. 2. If a match is made, the game elements within the match may be removed, and replacement game elements are generated that fall down from the top of the screen into the game board 501. However, if game elements are matched and thus removed from a second region 503, which is an area below the dividing line 40 in the example of FIG. 5*a*, then game elements may be generated and dropped into the gameboard 501 from the bottom of the screen. Thus, the physics of the tile below the dividing line 40 is such that there is an upward movement to complete the display, rather than a downward movement as in the upper section. The physics of each tile may be governed by the location of the tile vis-à-vis the dividing line 40. This dividing line 40 is visible to a player as a result of tiles above the dividing line 40 including a first visual indicator, and tiles below the dividing line 40 including a second, distinct visual indicator. The first and second visual indicators may include colours, textures, lines, contours, tile borders and other visual cues capable of rendering tiles in the first and second regions visually distinct from one another. The tiles below the dividing line 40, in the second region 503, may visually form a continuous background appearance which is referred to in the game as "soda". The term lemonade is intended only to denote a continuous colour formed by the tiles below the dividing line 40.

Game elements may not fall into the "lemonade" from above the dividing line. The dividing line 40 may therefore represent a barrier to game elements moving further downwards, or upwards when within the lower region 503. The physics of tiles above and below the dividing line 40 may be such that users in-game interpret the lemonade of region 503 as being a liquid in which game elements float (move upwards), and the region above the dividing line as being open space above the liquid in which elements fall downwards due to gravity.

Players may control the location of the dividing line 40 with respect to the displayed area of the game board 501. That is, players may move the dividing line 40 upwards on the screen in accordance with a particular game mechanic involving a special game element referred to herein as a soda activator or soda element 505. A plurality of soda element 505 types may exist, wherein a corresponding type of soda activator 505 may exist for each type of standard game element that may be provided on the gameboard. A soda element 505 may therefore be included in an in-game match with standard game elements (and/or other soda activator elements) of a same type.

Each soda element 505 may be associated with special game logic which is activated upon satisfying a qualifying match condition that includes a soda element 505. Upon activation of the special game logic associated with a soda element, the location of the dividing line 40 on the gameboard 501 may be altered. For example, the dividing line may be moved up the gameboard 501 by one or more row of tiles such that one or more corresponding row of tiles are included in the lower region 503 and include the visual indication associated with the lower region 503 (e.g. lemonade).

Figure 8:
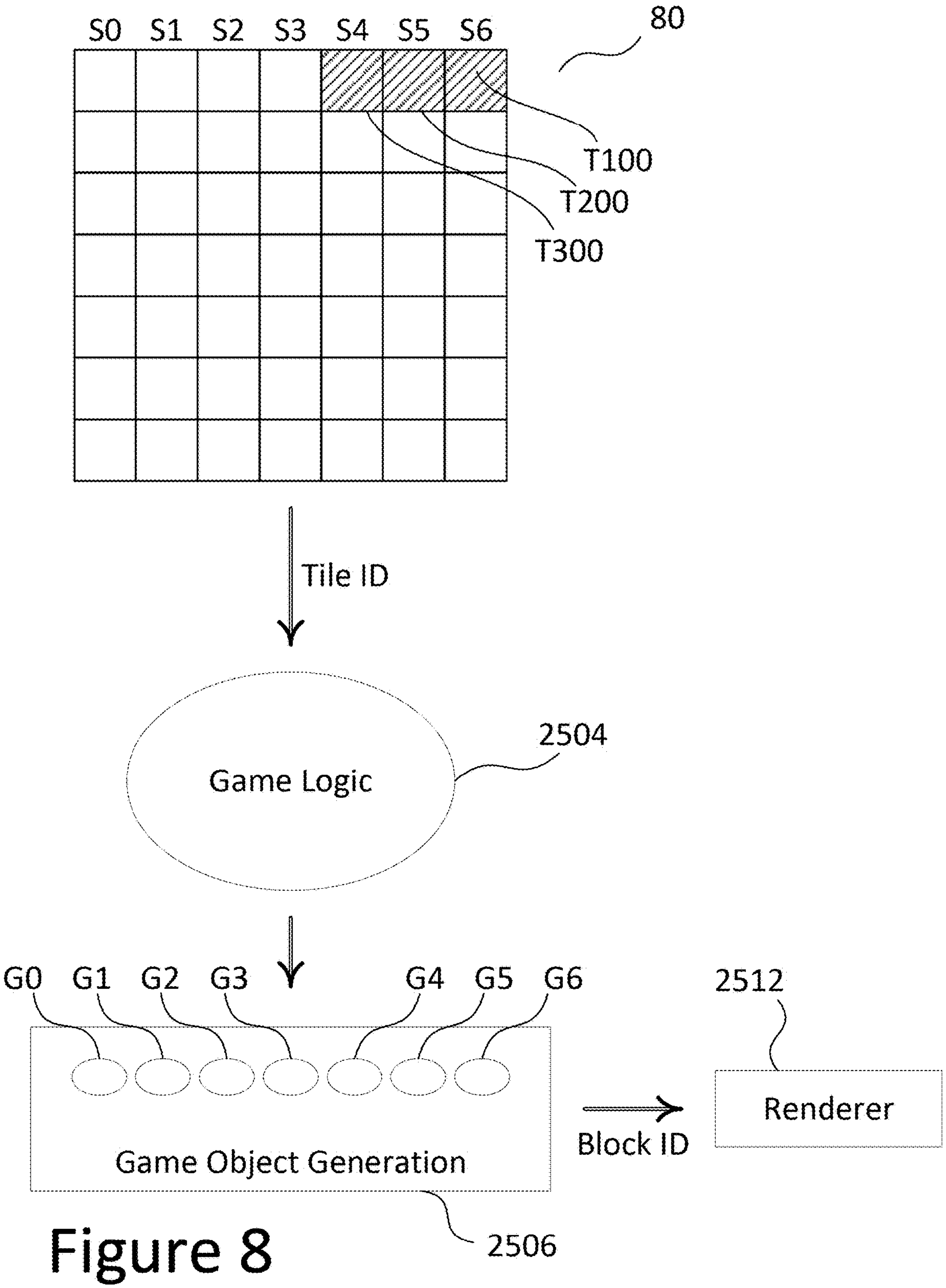
FIG. 8 shows a highly schematic diagram that represents a refill mechanism.

For the purposes of the following description of FIG. 8, the notation Txy will be used to denote a tile on the gameboard 501 located x tiles from the left and y tiles down from the top. For example, the game element of FIG. 5*a* to which reference numeral 505*a* points lies on tile T23 according to the above-defined labelling system.

By way of example, the element to which reference numeral 505*a* points, on tile T23 of the exemplary gameboard 501 of FIG. 5*a*, is a soda element 505 of a first type. The elements located in tiles T12 and T14 of the gameboard are standard elements of the same (first) type as the soda element 505. A user may satisfy a match condition by making an input indicating a switch of the soda element 505 with the element in tile T13, such that there are three adjacent elements of the same type in tiles T12, T13, and T14, one of which being the soda element 505. Upon making the switch indicated above, the special game logic associated with the soda element 505 may be activated, and the dividing region 40 may change location on the gameboard 501, such that the lower region 503 (lemonade region) correspondingly grows in size.

In the example of FIG. 5*a*, a game objective may be to match and remove a sufficient quantity of soda activators that the whole gameboard 501 is comprised within the lower region 503; i.e., such that the dividing line 40 is located at the top of the gameboard 501. For such a game objective (requiring the removal of a quantity of soda elements) to be achieved, at least a corresponding quantity of soda elements may be provided or generated on the gameboard during gameplay of the level. For example, the exemplary gameboard 501 of FIG. 5*a* shows a second soda element 505*b*, located in tile T27. In the example of FIG. 5*a*, the tile that supports the second soda element 505*b* comprises a casing attribute, as described above, whose removal may require satisfaction of a match condition that includes an element in an adjacent tile. Upon removal of the casing attribute, the second soda element 505*b* may be removed by subsequent satisfaction of a second match condition including an element in an adjacent tile relative to the soda element 505*b*.

Figure 5B:
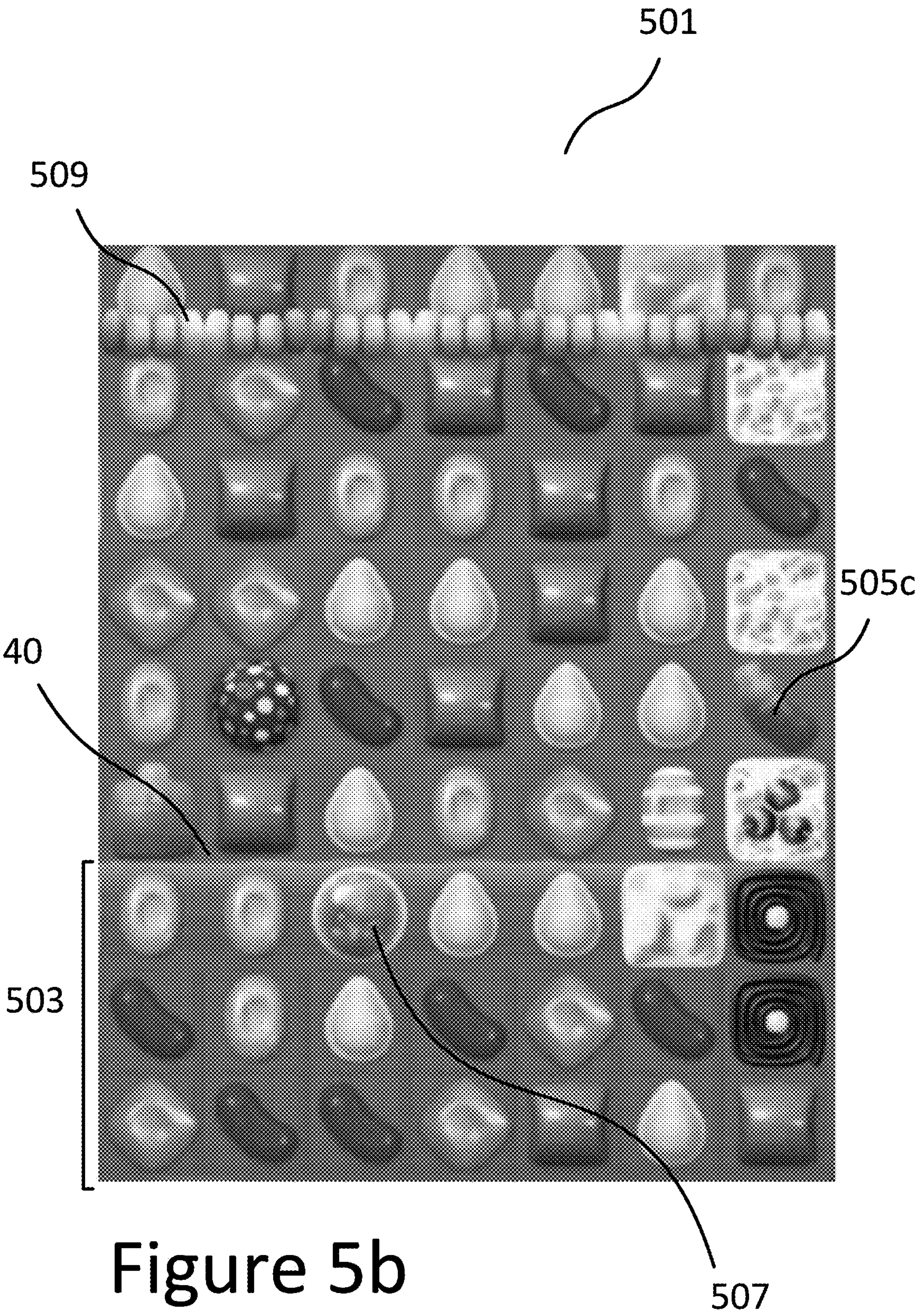
FIG. 5*b* shows a second exemplary level of a switcher game implementing a soda feature, the second exemplary level including a special game objective.

FIG. 5*b* shows a level of a switcher game including the soda region as described above, in which an alternative game objective is demonstrated.

FIG. 5*b* shows an exemplary gameboard 501 comprising a quantity of soda elements 505, e.g., soda element 505*c* located in tile T75. The gameboard 501 of FIG. 5*b* further includes a soda region 503 whose lower extreme is defined by the bottom edge of the gameboard 501 and whose upper extreme is defined by a dividing line 40.

As explained above, FIG. 5*b* demonstrates an alternative game objective of a switcher game level. The alternative game objective is characterised by a bear element 507, visually represented on the gameboard 501 as a gummy bear in a bubble, and a 'candy chain' 509 which extends across the gameboard 501. The bear element may be a non-actuatable game element that is unresponsive to user input, but which is responsive to gravity game mechanics. The bear element 507 may therefore "float" upwards in the soda region 503 when game elements in tiles above the bear element 507 are removed.

Note that the above-described game mechanic in which elements cannot 'fall' or 'rise' into a different gameboard region (e.g., into or out of the soda region 503) may apply to the gummy bear element 507.

The candy chain 509 may be a non-actuatable visual indicator on the gameboard that is unresponsive to user input and game mechanics such as gravity. That is, the candy chain 509 may merely provide a visual indication of the game objective within the level.

The game objective may be completed by causing the bear element 507 to reach the location on the gameboard at which the candy chain 509 is positioned. The bear element 507 may be caused to reach the candy chain 509 by activating soda elements 505 to expand the soda region 503 such that the dividing line 40 is located at or above the candy chain 509, and additionally satisfying in-game match conditions that cause the bear element to rise in the soda to reach the candy chain 509. It will be appreciated that one or more bear element 507 may be provided on a gameboard 501, and the game objective may be completed upon causing all or a subset of the bear elements 507 to reach the candy chain 509.

Mint/Container Element and Functionality Overview

The present invention relates to a computer device that is configured to implement a variant of a game that may use the above soda region feature. Note that features described herein may be implemented in a game which does not use a soda region. An overview of the new features provided by the invention are now described. Technical and practical implementation of the features outlined below is described later on, with reference to FIGS. 4 and 7-11*b*.

The present disclosure provides a computer device configured to provide a game to a user and, in particular, to provide a visually engaging special game objective comprising special game elements in the context of a matching game, such a switcher, clicker or linker The special game element may be referred to herein as a 'container' element, or a 'mint' element. Certain game elements may be triggered by activation of the special game element to acquire a special element attribute referred to as the collectable attribute, and become 'collectable elements'. Collectable elements are made visually distinct from other game elements, so they are readily identifiable by a user. A novel game objective is to collect the collectable elements. In certain embodiments, collectable elements may lose their collectable status as more game moves are made, testing the skill of a player. In some embodiments, special tile attributes are allocated to one or more tile. A tile having the special tile attribute may be described as having a 'foam attribute', and tiles with the foam attribute may be said to be included as part of a 'foam region'. The foam region seen in some embodiments may be made visually distinct from the rest of the gameboard. The special game element can cause the 'foam' to be allocated to certain tiles, by which the game elements on those tiles become "collectable".

One or more container element may be generated on a gameboard. The container element may be actuatable by a user; that is, it may be responsive to user input that indicates a switch operation with a second actuatable game element located in an adjacent tile relative to the container element. A container element may be activated and removed from the gameboard after satisfaction of one or more qualifying action, wherein a qualifying action may include a regular match condition comprising a game element in a tile adjacent to a tile comprising an activator element, or a direct impact by a booster element event.

Booster element events may include colour bomb activation events, striped booster candy events, wrapped candy events, fish booster events, jelly cake explosion events, striped hammer events, supersonic lolly events, and combined booster element events. As noted above, only a direct impact by an instance of the above-mentioned booster events may constitute a qualifying action. It will be appreciated that booster events that act on (e.g. remove) game elements in tiles adjacent to a container element may not constitute qualifying actions. The specific game mechanics of the booster elements referred to above are described later herein.

As described above, satisfaction of one or more qualifying action may be required to remove the container element from the gameboard. In embodiments where more than one qualifying action must be satisfied, the container element may be a layered container element and may be indicated as such in a tile data structure, as described later herein.

Removal of a container element from the gameboard may be detected by the game code, which may cause direct assignment of the collectable attribute to one or more element of the gameboard. Alternatively, in some embodiments, allocation of the foam attribute to one or more tile of the gameboard to form a foam region may be caused by removal of the container element. In such an embodiment, allocation of the foam attribute may subsequently cause assignment of the collectable attribute to one or more element of the gameboard supported by any tile in the foam region. In particular, removal of a container element in an embodiment where a foam region is formed may cause allocation of the collectable element attribute to one or more element within the foam region; i.e., to elements on tiles that include the foam attribute.

In some embodiments where a container element is a layered container element, removal of a layer may not cause assignment of the collectable attribute unless the removed layer is a final layer and the container element is removed from the gameboard altogether. However, a visual indication of a layer being removed may be provided on the gameboard to indicate to the user that a qualifying match has occurred and a layer has been removed. Similarly, in embodiments where removal of the container causes allocation of the foam tile attribute, the foam attribute may only be allocated upon removal of all layers of the container element.

In some embodiments, the container element may be visually represented as a mint candy. In embodiments where the container element is a layered container element, the element may be represented as a mint candy within a wrapper. A portion of the wrapper may be visually removed from the mint candy with each qualifying action until the mint candy container element is removed from the gameboard.

In embodiments where a plurality of tiles is assigned the foam attribute, to form a foam region, the foam region may be a single, amalgamated foam region. Alternatively, in some embodiments, the foam tile attribute may be assigned to tiles which are scattered around the gameboard and are not in a single contained foam region.

A predetermined number of elements may be assigned the collectable attribute when a container element is removed; for example, three elements may be assigned the collectable attribute. This is just one example—any number of game elements may be assigned as collectable elements, although it is noted that the number should normally be a number that could be collected within the bounds of play of that level. In embodiments where tiles are assigned the foam tile attribute upon removal of the container, a predetermined number of tiles may be assigned the foam attribute. For example, a single, contained foam region may be formed, and the foam region may cover a predetermined shape on the gameboard; e.g., a 2×2 square, a rectangle shape, or an irregular shapes of tiles which do not fit a generic x×y form.

A foam region generated by removal of a container element may be generated such that the tile that formerly supported the container element is allocated the foam tile attribute and is comprised within the foam region. That is, the foam region may be located around a tile which formerly supported an activated container element.

In other embodiments, a foam region generated by removal of a container element may be generated in a different location on the gameboard than where the removed container element was located. That is, the foam region may include tiles that are remote from the former position of the corresponding activated container element.

For players of the game, the foam region may be visually rendered such that it resembles foam caused by the real-world chemical reaction between carbonated (soda) drinks and mint candies/sweets. For this reason, in some embodiments, game mechanics and rules may be defined such that the in-game behaviour of mint elements, soda regions, and foam tiles reflect the real-world reactive behaviour of mint candies, carbonated drinks and foam resulting therefrom.

For example, in some embodiments, the above-described foam attribute is only assigned to tiles that are located within a soda region.

Further, in some embodiments, the removal of a container/mint element may only cause allocation of the collectable attribute to elements located within the soda region, or may only be activated if the container is within the soda region. Alternatively, in embodiments where a foam region is implemented, the foam attribute may only be assigned if the container element is located in a tile within the soda region. For this reason, a container located within the foam region may appear visually distinct from a container element located outside the soda region. A container element outside of the soda region may include a first visual indicator and a container element within a soda region may include a second visual indicator. A container element outside the soda region and having the first visual indicator may be modified such that it instead includes the second visual indicator upon causing the soda region to increase in size and surround a tile comprising the container element. It will be appreciated that the different visual indicators may enable a user to determine whether collectable elements will be assigned upon removal of the container element. In embodiments where a foam region is implemented, the visual indicator may enable a user to determine whether a foam region can be established by making a qualifying action at a particular container element.

Upon removing the container element, a non-empty subset of the game elements may be assigned the collectable element attribute. Collectable elements may be actuatable, but only normal game elements may be assigned the collectable attribute. That is, booster and blocker elements may not become collectable. In embodiments with a foam region, for example, if a foam region comprises four foam tiles, between 1 and 4 of the elements within the foam region may be assigned the collectable element attribute.

An objective of the game level may be to collect a quantity of collectable game elements by making a qualifying action. Qualifying actions to remove a collectable game element may include the same actions that cause a container element to be activated, as described above.

In some embodiments, further conditions may apply for a collectable element to be collected upon making a qualifying action. For example, in embodiments that include allocation of a foam region, a collectable element may only be collected if the qualifying action occurs while the collectable element remains in a foam tile. That is, if a collectable element is switched out of the foam region to make a match, the collectable element may become a normal element (that is, it's collectible attribute is removed) and matches with it do not contribute to a number of collectible elements.

When the effect of a special booster element acts on a tile comprising a collectable element, a qualifying action may be considered to have occurred, such that the collectable element that is affected is collected. As described herein, booster elements may be combined and their effects merged. In some examples of booster combinations, such as colour bombs combined with boosters such as line blasters and fish etc., all game elements of the same colour as the booster may be transformed into booster elements of the type that was combined with the colour bomb. Those transformed boosters may be activated according to the relevant booster mechanics described later herein. If a collectable element is transformed into a booster element in the scenario described above, that collectable element may be collected.

Further, a visual indication of the collectable attribute may be provided on the display to indicate to the user which game elements include the collectable attribute and may be collected upon completing a qualifying action.

A collectable element may turn back into regular game elements if an input indicating an invalid switch is made that includes the collectable element. That is, the collectable attribute may be removed from an element that is included in an attempt to make an invalid switch.

In foam region embodiments, the foam region may shrink in size by a factor of a half each time a valid switch is made. For example, a 2×2 foam region of 4 tiles may become a 1×2 or 2×1 foam region after a first valid switch operation. When the foam region shrinks, collectable elements in tiles that are thus no longer included in the foam region may lose their collectable attribute.

Two or more overlapping or immediately adjacent foam regions may appear visually merged on the gameboard and may decay in size as a single foam region.

Figure 6A:
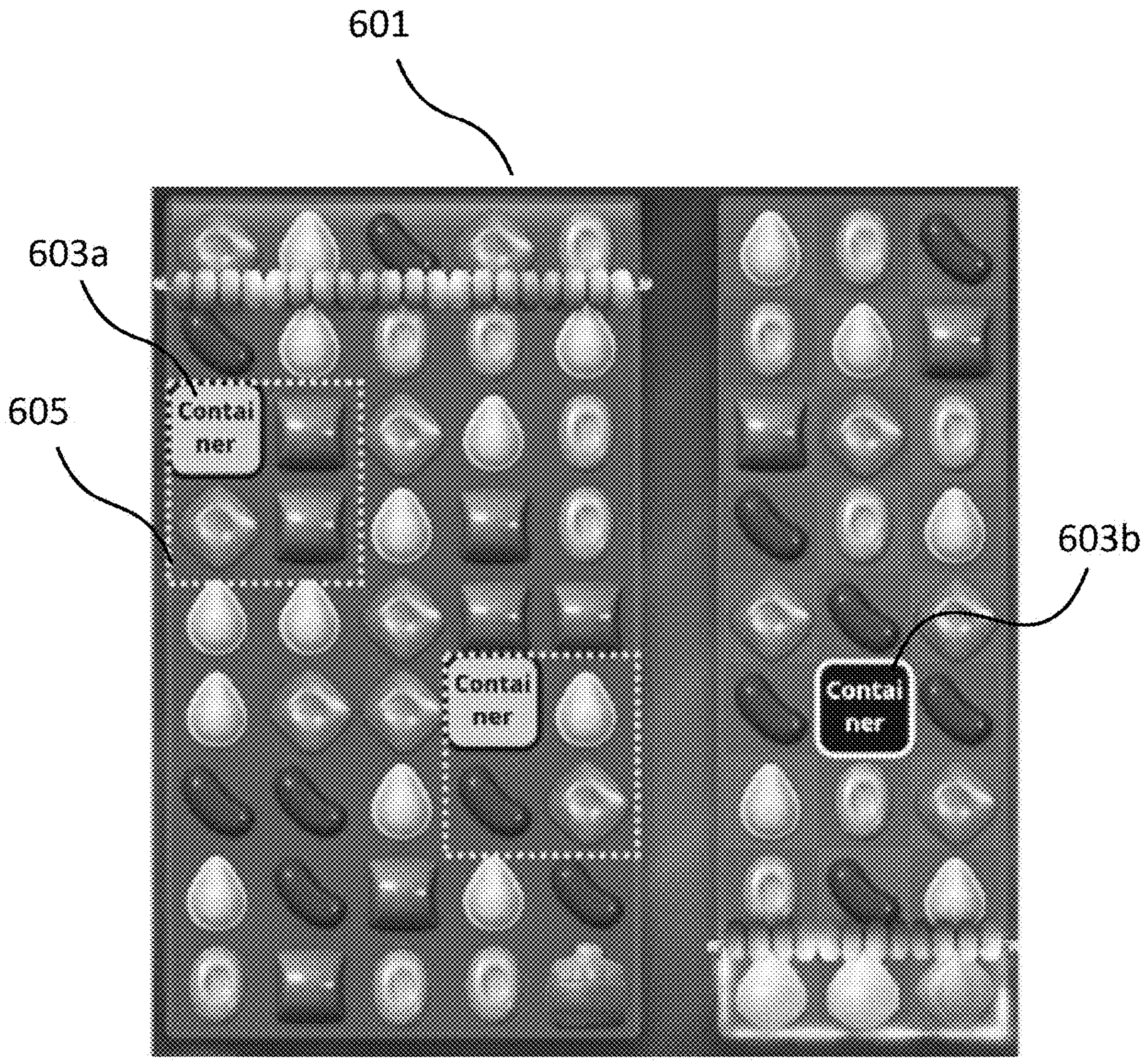
FIG. 6*a* shows an exemplary level of a switcher game in which the collectable element features are implemented, the gameboard of the level being in a first state.

FIG. 6a shows an exemplary gameboard 601 in which the container element feature is implemented, in accordance with some embodiments described above. The gameboard 601 includes a first gameboard portion on the left-hand side of the gameboard 601, and a second gameboard portion on the right-hand side of the gameboard 601. The whole first gameboard portion is a soda region. There is no soda region in the second gameboard portion.

FIG. 6a shows a first exemplary container element 603a located in the first gameboard portion, and a second exemplary container element 603b located in the second gameboard portion. The first and second exemplary container elements 603a, 603b respectively include first and second visual indicators, as described above, to indicate to the user that the first container element 603*a* is located in a soda region and the second container element 603*b* is not located in a soda region.

The gameboard 601 further shows a dashed region 605 which indicates an area in which game elements may be assigned the collectable attribute upon removal of the container element. Alternatively, region 605 may indicate an area where a foam region may, in some embodiments, be established upon making a qualifying action in respect of the first container element 603*a*. The dashed region may not be provided on the display in-game, and may only be shown in FIG. 6*a* for the benefit of the reader in understanding the new game concept described herein. Alternatively, no foam region may be established, and one or more of the elements within the region 605 may directly receive the collectable attribute upon removal of the container element. In alternative embodiments, game elements may be targeted for a collectible attribute which are distributed around the game board.

Figure 6B:
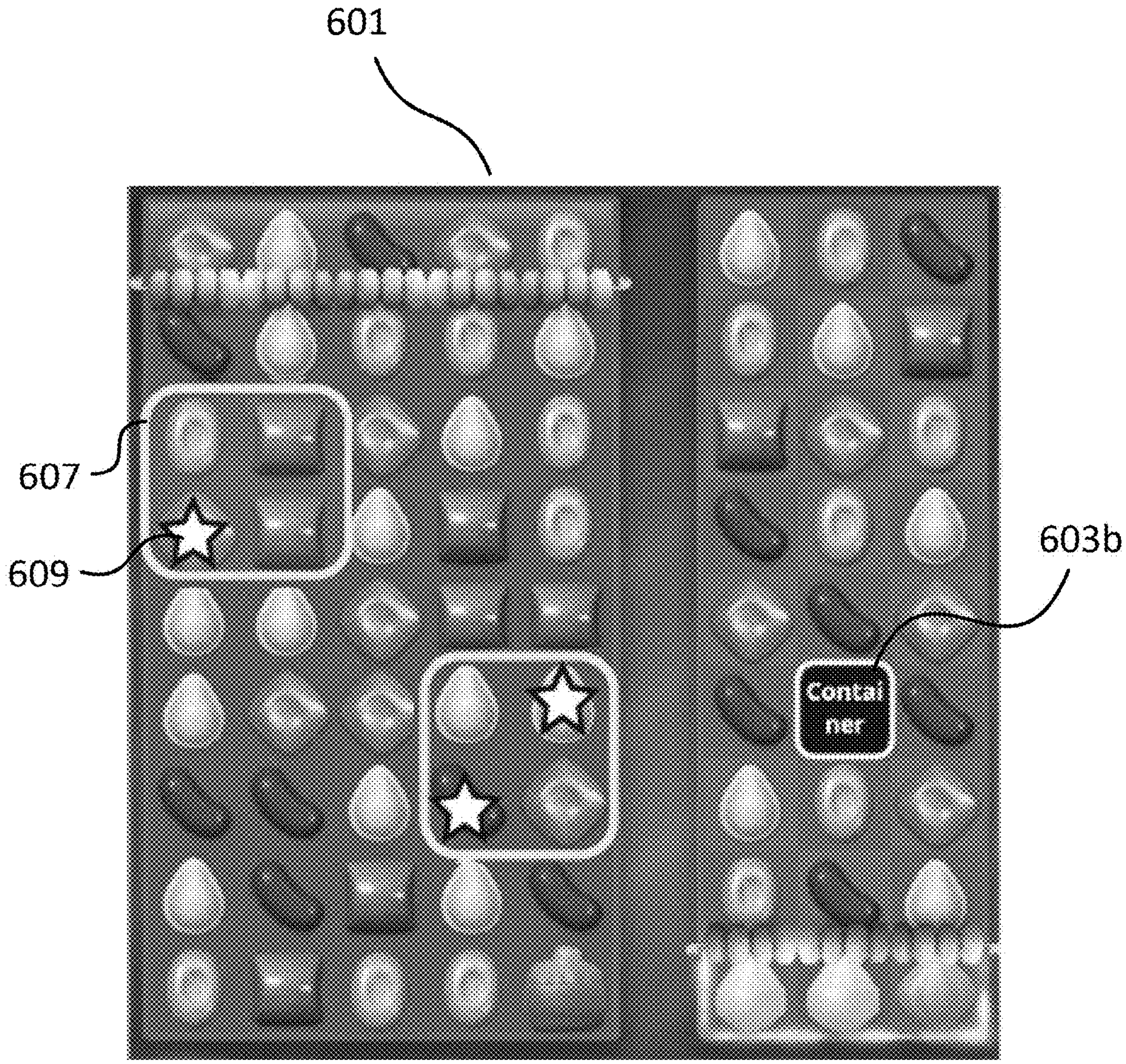
FIG. 6*b* shows the same exemplary level of a switcher game as in FIG. 6*a*, in which the gameboard is in a second state.

FIG. 6*b* shows the same exemplary gameboard 601 as in FIG. 6*a*, wherein the container element 603*a* has been activated by a qualifying action. In the example of FIG. 6*b*, the container element 603*a* has been removed from the gameboard. In some embodiments, a foam region 607 may have been formed. In the example of FIG. 6*b*, the location of a possible foam region is represented by a solid border around 4 tiles of the foam region. It will be appreciated that in other embodiments, the foam tiles themselves may include a visual indication that they are within the foam region 607.

The gameboard 601 of FIG. 6*b* comprises a collectable element 609, which has been randomly, pseudo-randomly, or deterministically allocated the collectable element attribute as a result of being within the region 605. Note that the exemplary collectable element 609 may also satisfy other conditions described above, such as originally being a standard game element. It will be noted that the exemplary region 605 may be of different dimensions than those shown in FIG. 6*a*. Alternatively no such region may be implemented, and a predetermined number of elements on the board may be assigned the collectable attribute upon removal of the container.

Functional Components

Figure 7:
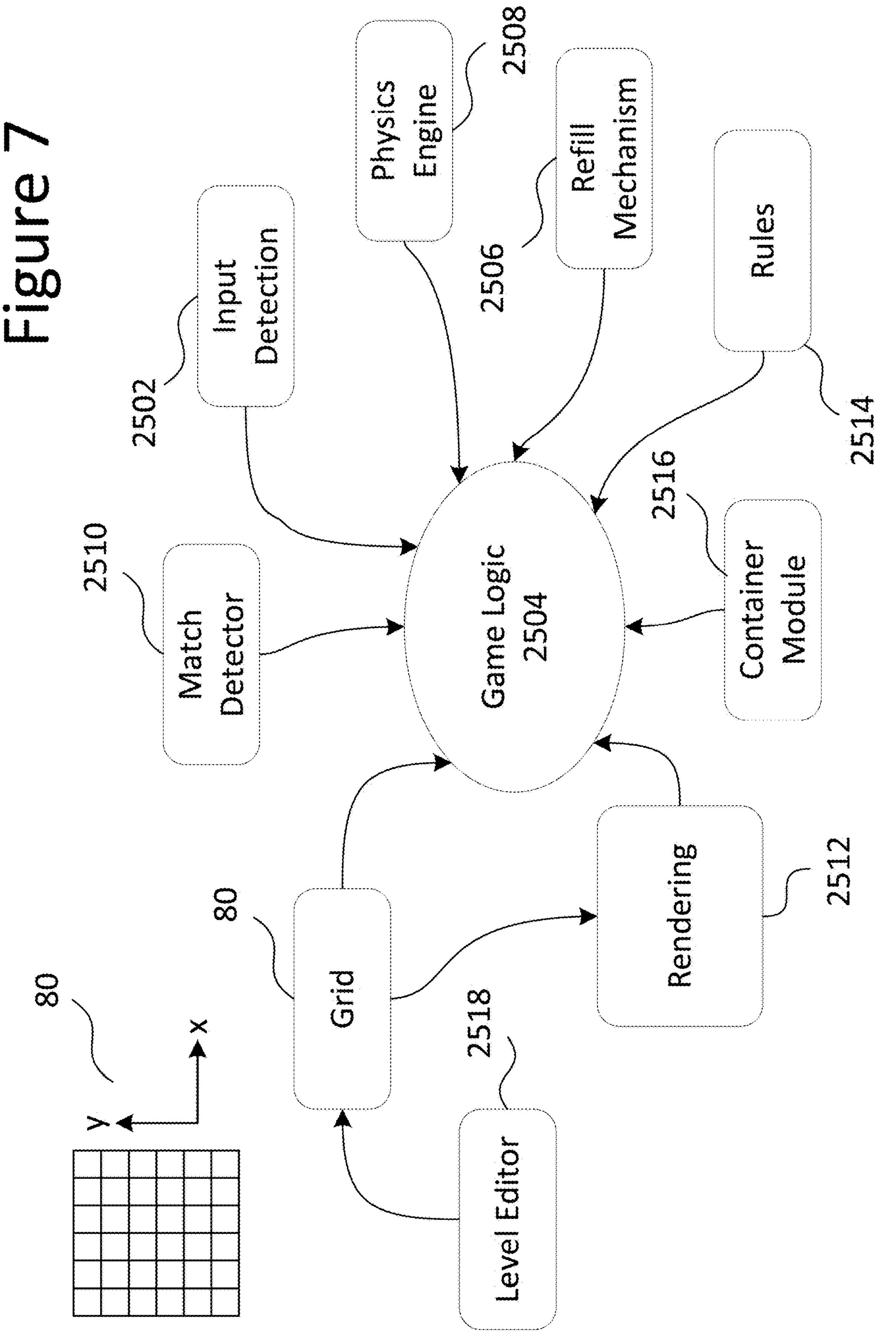
FIG. 7 shows a highly schematic diagram of computer-related architecture to implement an avatar path feature.

FIG. 7 shows a schematic representation of the functional components of an embodiment of a computer device, the computer device configured to implement special game elements and a special game objective in accordance with the present description.

Input detection 2502 captures the user input and feeds the input to the game logic 2504. The user input can be provided via any suitable user input device, such as those described above. In the context of the game, this user input can be used in a game view to indicate which game objects have been selected by a user, and thus to indicate the blocks to be switched and checked for adjacent matching blocks. Note that the term ‘blocks’ is used interchangeably herein to denote game elements or game objects. The game logic 2504 processes the information provided by the user input. The game logic 2504 may then determine if a valid selection has been made, and what the outcomes of the selection should be.

The rendering component is used to render the gameboard 2 to the user. It renders the game elements on the gameboard 2. Each time a game element moves tile location, for example, during a switch to make a match in a switcher game, or in gameboard refill, the rendering block is used to render this movement visible to the user on the display 1318 of the user device 240.

Figure 10A:
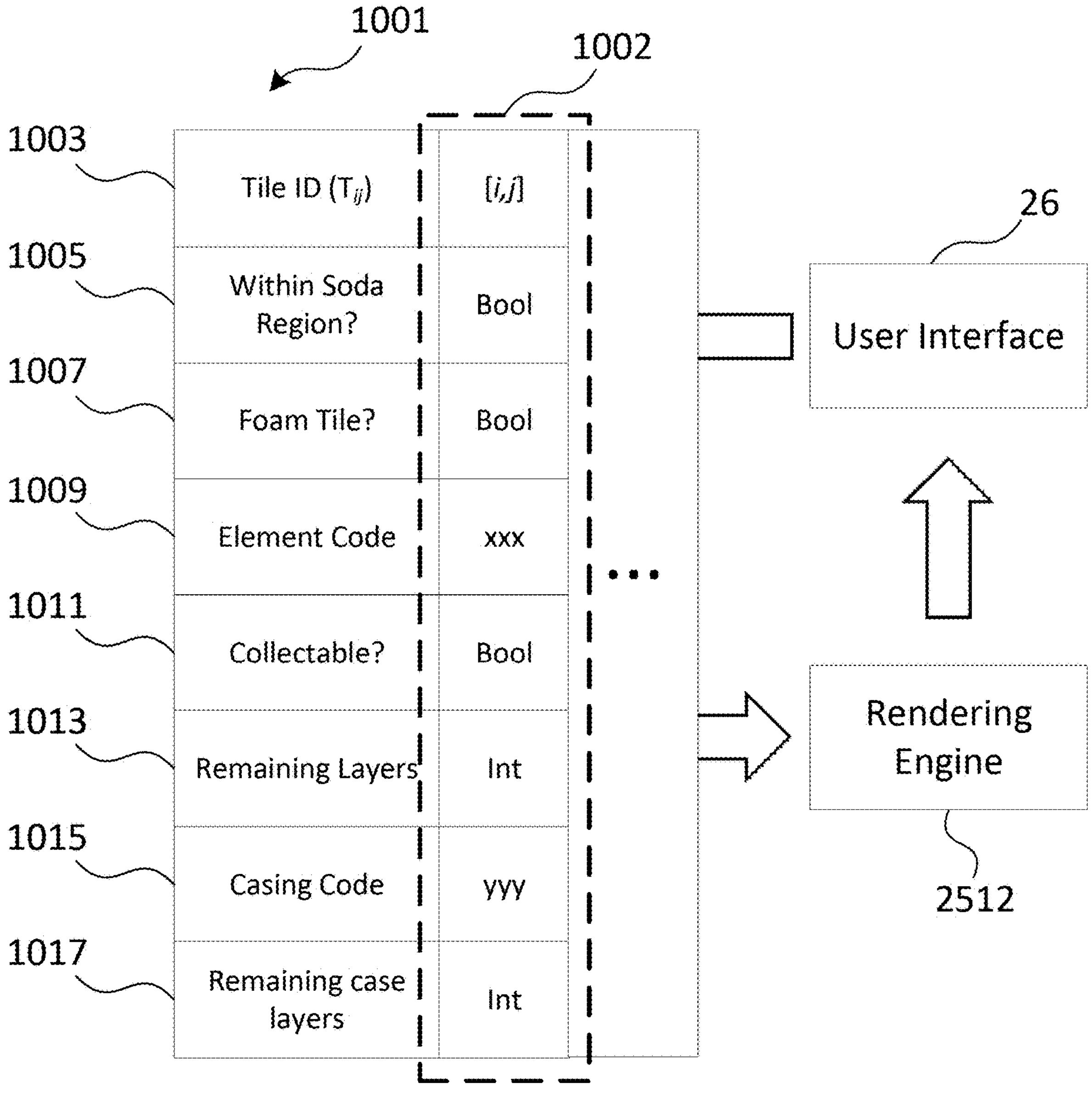
FIG. 10*a* shows an exemplary tile data structure for a level of the switcher game.

The grid component 80 stored in a memory provides a grid representation of the game board as shown schematically in FIG. 5. The grid component can be supplied by any suitable data structure, held in a local memory or remote memory accessible by the device, and is responsible for providing the game board layout. For example, the grid component may be supplied by a level data module 2518, as described later herein. As further described herein, the game board layout for each game level comprises game board locations at which tiles are located. The grid component identifies each tile location on the game board and holds tile data including a tile ID and associated attributes about the game element supported by that tile and displayed at that tile location. For example, the grid component 80 may include data structures such as that of FIG. 10*a*, the data structure comprising data pertaining to tiles and their attributes, and data pertaining to the soda region, soda elements, and mint (container) elements. FIG. 10*a* is described in more detail later. These associated attributes may then be used in combination with other components and data in other data structures in order to control the rendering of the display, e.g., a match detector component 2510, and a refill mechanism component 2506.

Each game object has object attributes associated therewith, which are basic attributes distinct from the special attributes discussed herein. The terms game object and game element are used interchangeably throughout this document and no specific meaning is intended using one or the other unless the context suggests otherwise.

The object attributes and special attributes may be stored in any suitable memory location. In some embodiments, the object attributes may be stored in the data structure with the special attributes. In some embodiments, the basic object attributes may be considered to be part of the game logic and in other embodiments may be considered to be outside the game logic. The basic object attributes may provide information as to the properties of a game object. These properties can include information of type/characteristic such as colour and/or whether or not a game object has a particular function such as a booster function or blocker function.

The game logic 2504 determines the game objects selected by a user, and the actions to follow to implement the game mechanic. The following describes an implementation using a ‘switcher’ mechanic where groups of 3 or more matching game objects) are created when a user switches two adjacent objects and the resulting matching adjacent objects are automatically removed. In a switcher game, whether the colour and/or shape characteristics of adjacent elements match is determined by a match check. This check may be carried out for the whole gameboard where there are game elements. All game elements on the game board are match checked against the game elements immediately adjacent to them. Alternatively, only some game elements on the gameboard are match checked. The game elements to be match checked may be determined by the location of user interaction with the gameboard, and/or the location of recent tile activity such as game element removal or game element refill. When multiple game elements are detected to have matching characteristics, a group of game elements is formed such that even game elements which are not directly adjacent to each other are included in the same group as long as they are connected in an adjacent manner via other game elements which also possess the same matching characteristic. In some embodiments, these groups of matching adjacent game elements may have to all be connected in one direction, i.e. they may have to be either vertically or horizontally connected. The match check is implemented after the player selects the two game elements to switch tile locations.

It will be appreciated that the device capable of providing the features described herein may be configured to provide a clicker game in which the qualifying match condition comprises two or more matching game elements provided adjacent each other on the game board, or a 'linker' game where game elements are dragged to form a match 3 or more condition.

The game logic controls the rules for determining if a valid match has been created for removal of the matched game elements from the gameboard. The game logic 2504 operates according to a set of rules of the level the user is playing. The game logic has access to data for each tile including its tile ID designating its location on the grid 80, and associated tile attributes providing information about the contents of that tile, e.g., the game object within that tile, at least one characteristic associated with the game object within the tile. The game logic 2504 is thus able to determine the game elements to be removed from those respective tiles for each user selection.

The physics engine component 2508 is configured to control the rendering of moving game objects in the display. The physics engine 2508 may be part of the game logic 2504.

A level editor 2518 is a tool with which a game designer creates game levels. The level editor may receive user input defining a gameboard layout, level objective and other aspects of a game level. For example, a level designer may define the location of tiles and an initial location of game elements within the level editor 2518. The level editor 2518 may output a file comprising computer readable instructions, including a data structure, which, when read, cause generation of a game level. The level editor 2518 thus outputs a data structure to be stored in memory of the grid component 80, providing predefined data for each level to the grid component 80, such as a gameboard layout. For example, the level editor 2518 may provide a predetermined layout of game elements to be placed in particular tiles of the grid.

FIG. 7 further shows a rendering engine 2512 which, as described later with reference to FIG. 8, may be configured to control a display to render the game on a user/client device. A shown in FIG. 7, the grid 80 may cooperate with the rendering engine 2512 to provide a gameboard to the user.

Element Generation and Refill

FIG. 8 is a highly schematic block diagram illustrating how gameboards are rendered visible to the user through a normal refill process. In the normal refill, the refill process may be set to random. In practice, the random refill process may be pseudo-random. As described earlier, each game level has a gameboard which is a layout of gameboard locations including tiles. Each tile has one or more tile attribute defined by tile data in the gameboard layout. FIG. 8 shows the gameboard layout in the form of the grid 80. The grid can be considered as a map which may be used to determine the relative positions of gameboard locations on the game board from the tile ID. The grid 80 shows an array of game board locations arranged in rows and columns. In FIG. 8, the grid 80 is shown with two dimensions, x and y. However, any alpha numerical designation can be used as the tile ID. No logical relationship between tile IDs is required. However, the grid position relationship between tile IDs may be determinable from the tile ID alone; e.g., by using an array of tiles with numbered rows and lettered columns.

As already explained, in order to render a gameboard on a display, each tile is associated with a game object to be rendered at that tile location. The nature of the game object, that is, for example, if it is a blocker or is playable (a normal game element or booster game element), or is an activator element, is determined by the tile attribute(s). The grid 80 is organised in sets S0 to S6. In this embodiment, each set represents a column of tiles in the array. However, sets may be organised in any appropriate manner. For example, they could be organised in rows or grids of tiles.

Shown in the tile grid 80 are three tiles T100, T200 and T300 which represent tiles where game objects may need to be spawned to replenish the gameboard. In a normal game refill process, new game objects are spawned in tiles that have an attribute associating them with playable (user interactable) game elements. A new game element is spawned into effect at an entry point of the set. For convenience, the endmost tile (in this case T100) can be considered the entry point for S6. However, any entry point for a set can be defined, and the precise entry point may depend on the orientation or shape of the set. Game objects are spawned into sets at their respective entry points. If the tile below the entry point is vacant, the spawned game object is moved down to that tile and then a further game object is spawned above it at the entry point. Note that sets may be of different configurations and spawned game objects may be moved to vacant tiles according to different refill physics.

Each tile of the grid 80 may be associated with data to indicate a status, such as filled or unfilled (empty/vacant) in relation to game elements. Thus, when the game board is refilled, each tile of the grid may be checked for such a status. Upon determining that there are tiles which are empty, the need to refill these tiles is recognised. Boolean logic may be used to determine whether a tile is to be refilled using the filled status of the tiles of the grid. The tiles must satisfy the condition of being unfilled in order to be refilled. As part of the refill mechanism, empty tiles are designated as the endpoint for particular game objects. This may be as the endpoint of a game element which is already in the game board and moving as a result of a game move due to the action of the physics engine 2508, or as the endpoint of a new game object entering the game board.

The game includes block generation logic 2506 which comprises a plurality of deterministic game element generating algorithms labelled G0 to G6. Each set is associated with a respective game element generating algorithm which spawns the new game element in a deterministic manner for its associated set. Game logic 2504 receives a tile identifier indicating a tile into which a game object is to be spawned. That is, the tile identifier indicates the set in which the tile belongs, and enables the entry point of the set to be indicated. This tile identifier enables the appropriate algorithm to be activated, and a game object identifier is generated by that algorithm to a renderer 2512 which controls a display 1318 on which the game board is presented to cause that game object to be inserted at the entry point. Within each set the process may be entirely deterministic. That is, game objects are provided in a predetermined sequence into the set, and moved through the set in a predetermined way. That sequence may be the same for all sets, or each set may have a different sequence. Alternatively, the game objects may be spawned in a random sequence. Randomly spawned game objects will still move through the set in a predetermined way, as dictated by the refill physics.

Each generator G0 to G6 can be controlled with a respective seed which then causes a pseudo-random sequence of game objects to be generated based on that seed.

The gameboard used in gameplay is defined by the grid 80. Attributes about the game objects occupying each tile of the grid are stored in association with the name, or ID, of the tile. This tile data may be stored in, for example, the tile data structure 1001 (see FIG. 10*a*).

Game Level Structure

Figure 9:
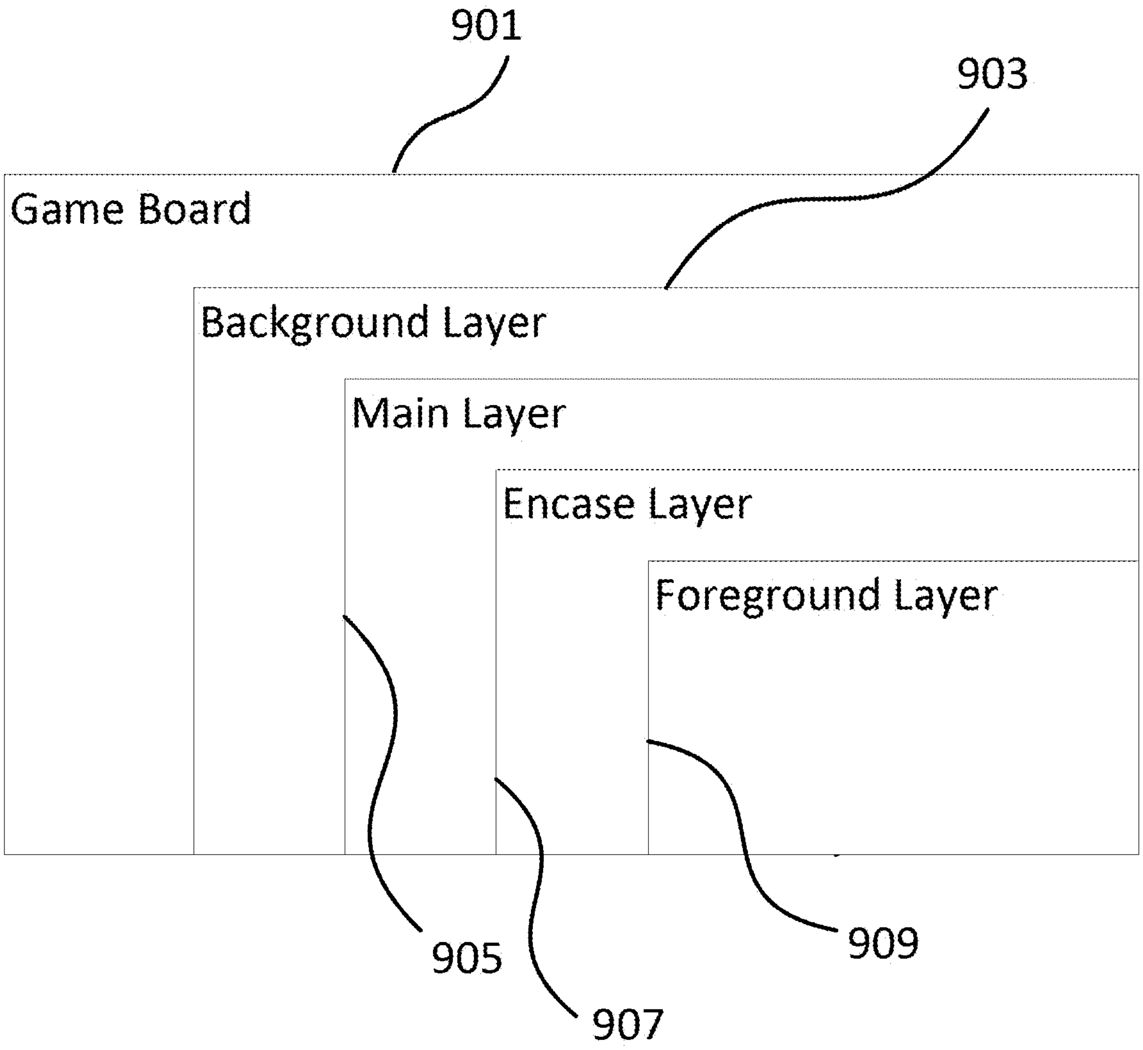
FIG. 9 shows a highly schematic diagram that represents an exemplary hierarchical structure according to which a gameboard may be parametrised.

FIG. 9 illustrates an exemplary layered or hierarchical structure according to which a game level may be defined. That is, one or more game feature, including tiles, special tile regions, game elements, special tile behaviours, element casings, may be assigned at a tile. FIG. 9 shows an exemplary set of "layers", which may provide a structure for storing data pertaining to a game level. For example, the layers shown in FIG. 9 may provide a structure for a tile database, such the one described later with reference to FIG. 10*a*.

A lowest, broadest, or fundamental layer in FIG. 9 is a game board layer 901. The game board layer 901 may define a grid on which the game level is to be played, and may define which of the gameboard locations are to include a tile. In embodiments where a game level objective is defined by a particular gameboard location, a field in a corresponding tile data structure may be provided within the game board layer to define an objective corresponding to a particular gameboard location or tile.

A second-order layer in the exemplary structure of FIG. 9 is a background layer 903. The background layer may define background tile behaviours and attributes such as a soda region or other "substance" attribute that may be assignable to tiles to indicate a special behaviour associated with those tiles.

A third-order layer in the exemplary structure of FIG. 9 is a main layer 905. The main layer 905 may support assignment of elements such as standard/normal game elements, stationary blockers, droppable blockers, avatar elements and the like. It will be noted that droppable blockers may be actuatable by a user, e.g., responsive to user switch operations to complete a valid match.

A fourth layer in the exemplary hierarchy of FIG. 9 is an encasement layer 907. The encasement layer may support allocation of 'locks' and other encasing features which may prevent actuation and/or removal of an underlying game element until the lock/encasement itself is removed. For example, the encasement layer may support allocation of a case such as that assigned to element 505*b* in FIG. 5*a* to tiles. Locks and encasements supported by the encase layer 907 may define special game logic that may require additional qualifying actions to be performed before the lock is removed, and before the underlying element is able to be removed.

Exemplary locks supported by the encasement layer 907 may include: chocolate, bubblegum, colour blockers, honey, ice, and chain blockers. It will be appreciated that these locks may be visually distinct on a gameboard and may be associated with different respective mechanisms for their removal. For example, different encasements may be associated with a different number of layers to be removed, or may be associated with special activation conditions or other game mechanics which cause their removal. The particular removal mechanisms of each of the above-mentioned encasements are considered design details in context of the present invention. However, it will be appreciated that an encasement may generally cause at least temporary prevention of actuation and/or removal of a game element from a gameboard.

Note that the layers of FIG. 9 may be considered as layers in a stack. The encasement layer 907 may be considered a higher order (or narrower) layer relative to the main layer 905, because the encasements and locks supported by the encasement layer may apply to an underlying game element defined in the (relatively) more fundamental main layer 905. Similarly, the encase layer 907 may itself be considered a lower-order/broader layer relative to a fifth layer in the hierarchy of FIG. 9, which is a foreground layer 909.

The foreground layer 909 may support surface level game features such as dispenser features. Dispenser features may be represented in game by 'candy cannons', which are configured to dispense game elements of a particular type upon satisfaction of particular conditions. The dispenser elements may be considered part of the game board design and may not be positioned in tiles. The dispenser elements may instead be displayed outside of the set of game tiles, e.g. above a particular column of the gameboard.

The layers described above may define a hierarchy or structure by which elements are defined. Data structures comprising data pertaining to a level of the game may comprise a plurality of configurable fields, each field corresponding to a tile or element attribute. The fields used to define attributes of a gameboard may be organised or structured according to the above-described system of layers. An embodiment of such a data structure is now described with reference to FIG. 10*a*.

Data Structures

FIG. 10*a* shows an exemplary tile data structure 1001 comprising tile data for a level of a switcher game. The exemplary tile data structure 1001 may be stored in memory and be accessible to the processor for rendering the level of the game in accordance with the data in the tile data structure 1001. The tile data structure 1001 may be updated to reflect element position changes and other gameboard changes resulting from user input, refill mechanisms booster effects and the like.

The tile data structure 1001 may provide data to the rendering engine 2512 such that the data can be used to render a game on a gameboard presented on a user interface 26. The tile data structure 1001 includes an entry 1002 for each tile on the gameboard, each entry 1002 comprising a plurality of values for a corresponding plurality of attributes for the associated tile. Reference numeral 1002 of FIG. 10*a* points to a dashed box surrounding an exemplary entry within the tile data structure 1001. An 'entry' may therefore be understood as a column in the data structure 1001 corresponding to a particular tile or gameboard location. Whether the data structure provides an entry for all gameboard locations or just those comprising tiles is dependent on the embodiment, as described in more detail below.

The exemplary tile data structure 1001 of FIG. 10*a* shows a plurality of exemplary configurable attributes. Each entry 1002 within the tile data structure 1001 may provide a value in respect of each of the provided attributes. The rendering engine 2512 may use the data provided in a particular entry 1002 of the data structure 1001 to correctly render a corresponding tile on the gameboard, including an element to be comprised therein.

In the example of FIG. 10*a*, only one generic entry 1002 is shown, and the values provided in respect of each attribute in the entry 1002 represent an exemplary format, according to which the attribute may be defined. For example, "Bool"

may indicate that the attribute takes a Boolean or binary value, "Int" may indicate that an integer value is taken etc. The value formats of each exemplary attribute are described in more detail in the description that follows.

In some embodiments, an entry 1002 in the data structure 1001 may be provided for each gameboard location on the grid.

Game logic and data stored in the memory may be configured to associate a particular entry in the data structure 1001 (corresponding to a tile) to a particular corresponding gameboard location.

A first attribute that may be assigned a value at each entry in the data structure 1001 is a tile ID attribute 1003. The tile ID 1003 value for an entry 1002 may act as a reference value for a corresponding tile (or gameboard location). That is, the rendering engine and game logic may perform operations based on data in the tile data structure 1001. The correct data item may be retrieved from the tile data structure 1001 by referencing a correct tile ID value.

In the example of FIG. 10, the Tile ID attribute 1003 is defined by a first and second integer value in an array. That is, tile $T_{ij}$ is defined by an array [i, j] where the i value indicates a horizontal index of the corresponding tile on the grid, and the j value indicates a vertical index of the corresponding tile on the grid. It will be appreciated that other value formats may be used.

With reference back to FIG. 9, it should be noted that the tile ID attribute may form part of a game board layer 901 in the hierarchy of layers.

A next attribute that may be assigned for each entry in the data structure 1001 indicates whether the tile is within a soda region; this attribute is denoted 1005. A tile may either be a soda tile or not a soda tile, and the soda attribute 1005 of a particular tile may therefore be defined by a binary or Boolean value, as indicated in FIG. 10*a*. with reference again to FIG. 9, the soda attribute 1005 may form part of the background layer 903. In practice—i.e., during gameplay—a 'yes' or '1' value in the soda attribute may indicate that the corresponding tile is to be displayed with a particular visual indication associated with soda tiles. The visual indication may be held in memory. A 'yes' or '1' value may further indicate to the processor that special game logic associated with soda tiles should be applied to the corresponding tile.

FIG. 10*a* represents an exemplary data structure for an embodiment in which a foam region is implemented. A foam tile attribute 1007 is shown in the exemplary tile data structure 1001. As described previously herein, a tile may be assigned a foam attribute. Tiles may either be foam tiles or not foam tiles, and values of the foam attribute 1007 may therefore be of a binary or Boolean type.

In some embodiments described herein, a foam tile attribute 1007 may only be assignable to a tile that includes the soda attribute. In such an embodiment, the foam attribute 1007 of all tiles outside the soda region (i.e., tiles which don't include the soda attribute) may include a '0' or 'FALSE' value. Alternatively, a third value/state, e.g.: N/A, may be automatically assigned to all tiles that are not in the soda region (e.g., that include a '0' or 'FALSE' value in the soda attribute). This N/A state of the foam attribute may be changed to '0' or 'False' when the associated tile becomes part of the soda region.

The foam attribute may be supported by the background layer 903 of FIG. 9. However, in embodiments where foam tiles can only be located within soda tiles, the background layer may be divided into sub layers. That is, in such an embodiment, the soda attribute 1005 is a prerequisite for a tile to which the foam attribute 1007 is to be assigned, so the foam attribute 1007 may be considered as forming part of a narrower or higher-order sub-layer within the background layer 903.

An element code attribute 1009 is also configurable in the tile data structure 1001 of FIG. 10*a*. A value assigned at the element code attribute 1009 for a particular entry 1002 may indicate a type of game element that is to be rendered at the corresponding tile on the gameboard during gameplay.

In practice, the element code value provided for a particular entry 1002 may specify a particular data record in an element database. The specified data record may comprise rules, image files, behaviour logic and other data specific to the element type that is identified by the element code value. During gameplay, the rendering engine 2512 and game logic 2504 may retrieve rules and other data pertaining to elements in each tile in order to implement the predefined behaviour of each type of game element. This retrieval may be based on element codes specified for each tile in the tile database 1001, and may be further based on data in the element database that define the behaviours and other characteristics (e.g., visual appearance) of each element type.

Reference is now made to FIG. 10*b*, in conjunction with FIG. 10*ba*. FIG. 10*b* shows an exemplary element database 1019, such as the one outlined above. The exemplary element database 1019 comprises data pertaining to all possible game elements that are assignable to a tile of a gameboard in the switcher game. For conciseness, only a small subset of relevant element types are shown in the database 1019 of FIG. 10*b*.

Further, the element database 1019 of FIG. 10*b* only illustrates two exemplary attributes of each of the subset of game elements. A first attribute is an element code 1012, and a second attribute is a parameter whose values indicate whether each type of game element can be assigned the collectable attribute.

The element code of an element in the database 1012 may be specified in the tile data structure 1001 of FIG. 10*a* to assign the corresponding game element to a tile of the gameboard. That is, by specifying a particular element code in the tile data structure 1001, a link is made between the tile for which the element code is specified (in the tile data structure 1001) and the element properties defined in the element database 1019. A processor performing the game logic may therefore provide the specified game element in the associated tile, and operate the game according to behaviours of the specified element type and other attributes of the tile.

A second attribute 1023 in the exemplary element database 1019 indicates whether the corresponding game element is capable of becoming a collectable game element. As described above, only standard game elements may be allowed by the game rules to become collectable elements, either directly by removal of the container or, in some embodiments, when they are within a foam tile. The collection eligibility attribute 1023 may take a Boolean or binary value. For example, the elements "red candy" and "orange candy" are standard game elements, and are therefore defined as being eligible for allocation of the collectable attribute.

Whilst not shown in FIG. 10*b*, all behavioural attributes associated with each element type, such as but not limited to: special refill phase behaviour, special gravity logic rules, switchable or non-switchable (actuatable or not), initial number of layers, retrievable image files for rendering on the gameboard, and any other behaviour logic may be parametrised in an element database such as that of FIG. 10*b*.

In the example of FIG. 10*b*, descending from the top of the database 1019, rows corresponding to the following element types are shown:

A red candy having exemplary element code '001', which is a standard game element; an orange candy having exemplary element code '002', which is a standard game element; a blue soda bottle having exemplary element code '003', which may be activated in a match with other valid blue candies to increase a number of soda tiles on the gameboard; a container element having exemplary element code '004', which may be activated by a qualifying action to cause allocation of the collectable attribute to one or more game elements or, in some embodiments, allocation of the foam attribute to one or more tile; and a green striped booster element having exemplary element code '005', which when activated has an effect as described later herein.

The element database 1019 may define invariable templates of element types that may be provided on a gameboard. That is, the element database 1019 may be a static, read-only data structure used as a reference table by the processor to implement game logic associated with game elements. By contrast, the tile database 1001 of FIG. 10*s* comprises data that relates to an actual game level, and, as described earlier herein, may be updated each time a match condition is satisfied, or any time a substantive change occurs in respect of a game element or its position on the gameboard.

The tile data structure 1001 further includes a collectable attribute variable 1011, which may be defined by a binary or Boolean value. The value assigned to the collectable attribute variable 1011 for a particular entry 1002 may define whether the element in the associated tile is collectable or not, in accordance with the above description of collectable elements. An entry in which the collectable element attribute is set to 'TRUE' may therefore indicate that an element in the associated tile should include a visual indicator (i.e., a different sprite) that indicates the element is collectable, and game logic should operate in accordance with game rules associated with collectable elements, as described in the feature overview above.

A distinction between the collectable attribute 1011 and the collection eligibility attribute 1023 should be appreciated. The collection eligibility attribute 1023 is a static, inherent property of a elements of particular types; that is, certain elements can become collectable in-game. By contrast, the collectable attribute 1011 is a variable attribute that may be updated in the data structure 1011 when an element of an eligible type becomes collectable.

As explained above, the element database 1019 may be static or invariable, and may not be updated based on in-game events. Therefore, the tile data structure 1001 may comprise a variable 'remaining layers' attribute 1013 configured to track a number of remaining layers of an element, based on events (i.e., layer removal triggers) that occur during gameplay.

Values in the remaining layers attribute 1013 may, upon first loading the game level, be equal to a default number of layers for the element comprised in the corresponding tile. That is, an initial/default value in the remaining layers attribute 1013 of a particular entry 1002 in the tile data structure 1001 may be based on a default number of layers defined in the element database 1019 (FIG. 10*b*) for the corresponding element type.

A value in the remaining layers attribute 1013 of a particular entry 1002 may be decremented upon satisfaction of an activator trigger condition. When the remaining layers value is decremented to a critical value, e.g., 0, the corresponding element may be removed from the gameboard.

Note that the element code fields 1009, collectable attributes 1011 and remaining layer attributes 1013 of FIG. 10*a* may be considered as forming part of the main layer 905 shown in FIG. 9.

The tile data structure 1001 of FIG. 10*a* further includes a casing code field 1015. A value in the casing code field 1015 of a particular entry 1002 may define a lock or encasement to be applied over a game element of the corresponding tile. The casing code of a particular entry may specify a particular type of lock/encasement in an encasement data structure, such as is shown in FIG. 10*c*.

FIG. 10*c* shows an exemplary encasement database 1025 comprising data for all types of encasement that may be applied on a gameboard. Similar to the element database 1019 of FIG. 10*b*, the encasement database 1025 may be an invariable read-only database holding generic data pertaining to each type of encasement.

The exemplary encasement database 1025 includes an index of all encasements that may be provided in game, each encasement type being associated with an encasement code and a default layers field 1029 defining an initial number of layers. It will be appreciated that whilst the above fields are the only ones shown in the exemplary encasement database 1025 of FIG. 10*c*, other encasement attributes may be configurable to define attributes and other special game rules associated with each type of encasement.

Furthermore, it will be appreciated that not all encasement types are represented in the encasement database 1025. Other encasement types than those shown may be provided.

A value in the casing code field 1015 of FIG. 10*a* may specify a particular encasement type to be implemented on the gameboard. However, upon loading of a game level for gameplay, changes to the in-game state of the encasement may be handled by updates to the tile data structure 1001, rather than by updating the invariable template provided by the encasement database 1025. For example, the tile data structure 1001 includes a remaining encasement layers field 1017, which may, upon initial loading of a gameboard, be populated with the default value 1029 of the corresponding encasement type (i.e., from the encasement database 1025). The remaining encasement layer field 1017 may be updated when a qualifying action occurs to decrement the value therein. At a critical value, e.g., 0, the encasement may be removed.

If no encasement is to be allocated to a particular tile, the encasement code field for that tile may be blank. Alternatively, a placeholder encasement code may be provided to represent 'no encasement'.

Game logic may determine that if an encasement comprising layers is provided in a particular tile, that the encasement layers are removed before any layers of a corresponding game element are removed.

The casing code 1015 and casing layers attributes 1017 may be considered as forming part of the encasement layer 907 of FIG. 9.

It will be appreciated that the tile attributes shown in FIG. 10*a* are provided as an exemplary non-exhaustive list and that any variable or invariable tile attribute not represented in FIG. 10*a* may nonetheless be configured in a tile data structure.

Exemplary Workflow of a Game Level

Figure 11A:
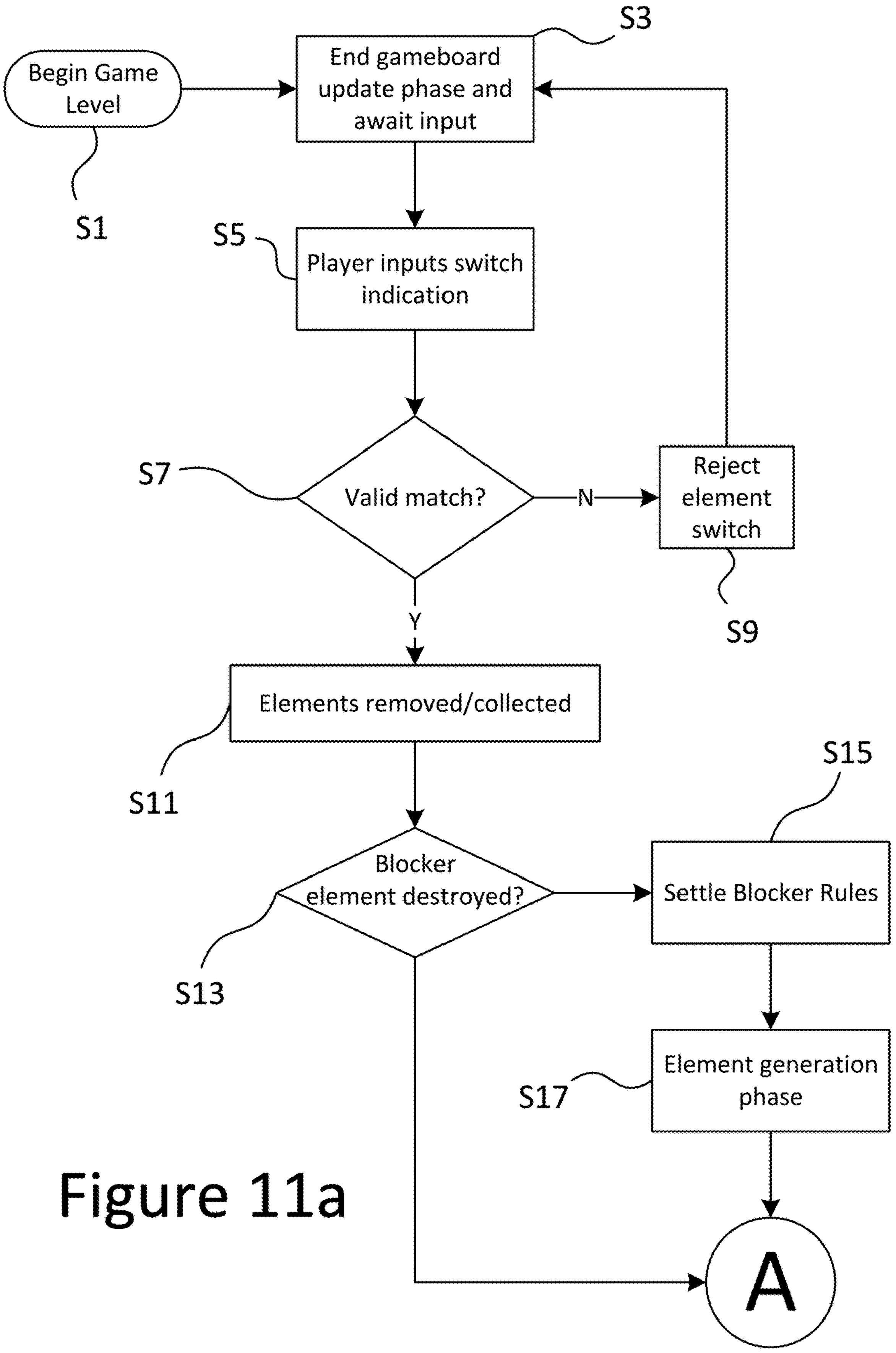
FIG. 11*a* shows a first portion of a flowchart that represents a gameplay workflow according to the present invention.
Figure 11B:
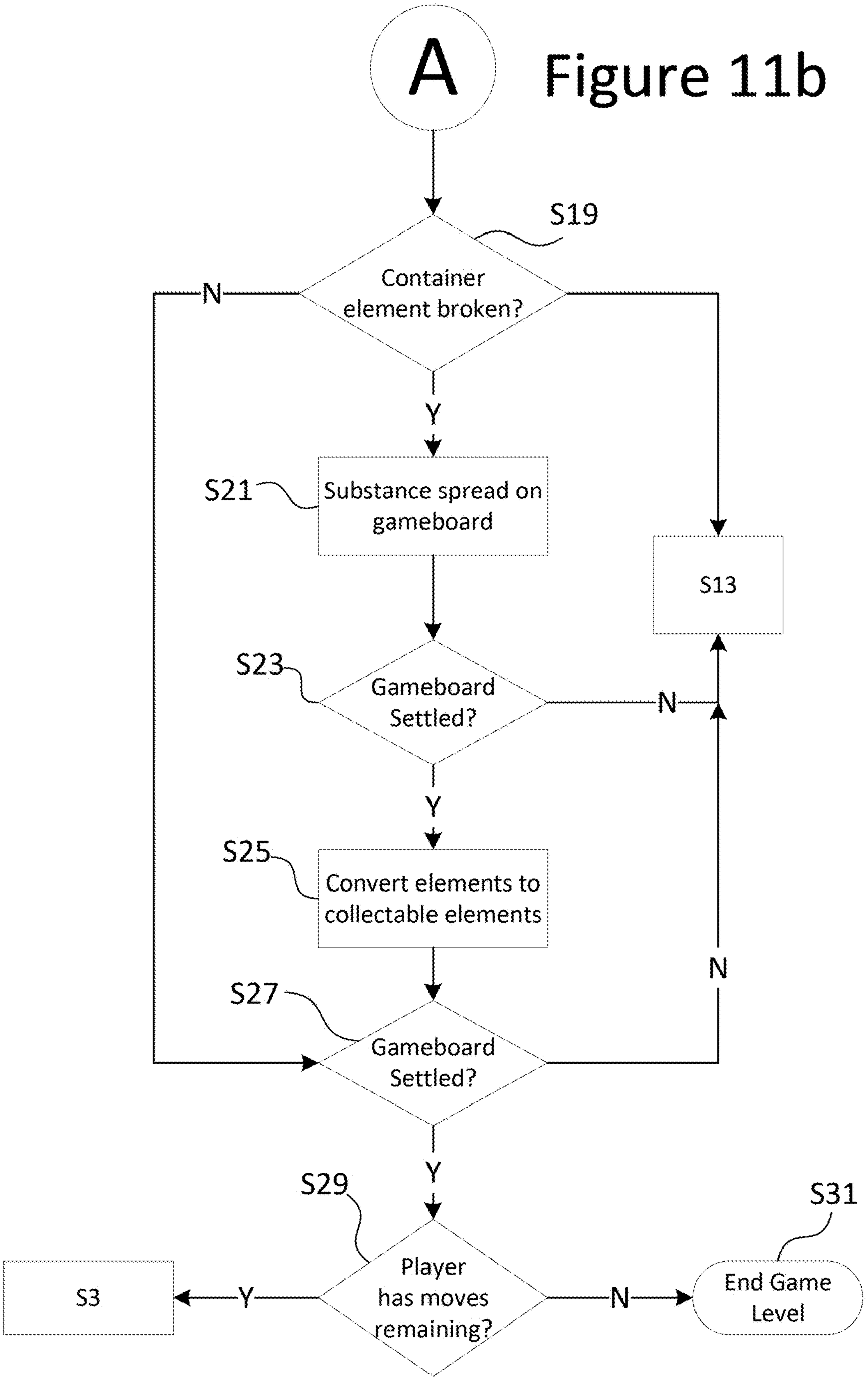
FIG. 11*b* shows a second portion of the same flowchart as in FIG. 11*b*.

FIGS. 11*a* and 11*b* respectively show first and second portions of a flowchart. The flowchart represents an exemplary sequence of events that may occur during gameplay of a switcher game configured to implement the game features described herein. The above 'events' represented by blocks of the flowchart in FIGS. 11*a* and 11*b* may represent user-initiated events, display events rendered on a display device, or back-end processing events in which game logic is executed to implement the avatar path feature described herein. It will also be appreciated that 'determinations' of certain criteria or conditions being met, as described in respect of FIGS. 11*a* and 11*b*, may in practice be made based on execution of game logic by a processor of the client device.

The flowchart begins at a step S1, shown in FIG. 11*a*. Step S1 may include rendering a gameboard on a display of the client device and rendering game elements on the gameboard according to level data stored in memory.

At a next step, S3, the gameboard is settled. That is, element generation is completed and any in-game display sequences comprising instructional narratives or hints may be performed. Step S3 may end when the gameboard is static and is awaiting user input. Step S3 may be a final consolidatory step performed after each user move to settle the gameboard and await a next user input.

At a step S5, a player enters a user input indicating a switch operation on the gameboard. That is, the user may select a first game element in a first tile and provide an indication of a second tile that is adjacent to the first tile, the second tile comprising a second game element. The user input may indicate the user's intention to switch the position of the first element with the second element.

At a step S7, a determination is made as to whether the user input received at step S5 indicates a valid match. That is, game logic may determine at step S7 whether the user input of step S5 indicates a switch that results in satisfaction of a match condition according to the game rules.

If, at step S7, the user input is not deemed to indicate a switch that satisfies a match condition, the flow progresses to a step S9, in which the switch operation indicated by the user input is rejected. On completion of step S9, the flow continues back to step S3, in which the gameboard is settled and further user input is awaited.

If a valid match is identified at step S7, the flow progresses to a step S11, in which elements forming part of the match are removed from the gameboard. Other game logic may also be implemented at step S11, such as a collection of any collectable game elements, where those elements form part of the match and satisfy other collection conditions described earlier herein.

Step S11 is followed by step S13, in which a determination is made as to whether a blocker element is destroyed by the match. If a blocker element is destroyed, the flow progresses to a step S15, in which blocker rules are settled. For example, in step S15, a layer may be removed from the blocker or, if no layers remain, the blocker may be removed from the gameboard.

Upon settling the blocker rules at step S15, the flow continues to an element generation phase S17, in which a gravity effect (physics) may be implemented that causes elements to move into empty tiles in a direction of the gravity effect (e.g., downwards in normal tiles and upwards in soda tiles). Empty tiles at the top and bottom of the respective soda/non-soda regions may then be filled with new game elements in an element generation phase, from the top and bottom of the gameboard respectively.

Step S17 is shown to enter a block labelled 'A'. Block A is provided in FIG. 11*a* to represent a link between the first portion of the flow in FIG. 11*a* and the second portion of the flow in FIG. 11*b*. A counterpart to block A in FIG. 11*a* is provided in FIG. 11*b*.

If at step S13, it is determined that no blocker element is destroyed, the flow progresses directly to block A, bypassing the steps in which blocker rules are settled.

The block A counterpart in FIG. 11*b* flows into a step S19. It will be appreciated that since block A merely represents a link between FIGS. 11*a* and 11*b*, step S17 of FIG. 11*a* therefore flows into step S19. Step S13 may also be considered to flow into step S19 in instances where no blocker is destroyed. It will be appreciated that FIG. 11*b* represents a workflow that applies in embodiments where a foam region is implemented.

At step S19, a determination is made as to whether a container element, as described earlier herein, is broken/destroyed. If it is determined that no container element is broken, the flow progresses to a step S27, which is described later. It will be appreciated that if no container is broken, the flow bypasses a series of steps that pertain to generation of (in some embodiments) a foam region, and generation of collectable elements, events which may only occur once a container is broken.

If a container element is determined to be broken at step S19, the flow continues to a step S21 in which, according to some embodiments, a 'substance' or 'foam region', as described earlier, is applied on the gameboard. That is, breaking a container element may cause the foam attribute to be assigned to one or more tile of the gameboard. In some embodiments, foam tile may only be established within the soda region. In yet other embodiments, the foam region may only be applied if the container element is broken within the soda region. In embodiments where no foam region is established and game elements are directly allocated the collectable attribute upon removal of the container element, step S21 may not be implemented.

Following step S21, the flow progresses to a step S23 in which a determination is made of whether the gameboard is settled. For example, the determination of step S23 may include an assessment of whether any further element removal conditions are satisfied.

If the gameboard is not determined to be settled at step S23, the flow continues back to step S13 of FIG. 11*a*, which is described earlier.

If the gameboard is determined to be settled at step S23, the flow continues to a step S25. At step S25, one or standard game element may become a collectable game element in accordance with rules and conditions of embodiments described earlier.

It will be noted that step S23 may be an important prerequisite to step S25. That is, causing game elements to become collectable game elements only once the gameboard is settled may improve gameplay.

Collectable elements may be incidentally collected during a cascade or chain of valid matches. However, a game element may not be allocated the collectable attribute and collected within a single cascade. The gameboard waits to be settled before allocating the collectable attribute.

Once the gameboard is settled, the flow then continues to a step S25, in which one or more element is converted to a collectable element. As described earlier, only standard game elements may be eligible to become collectable, and game elements may take on a different visual appearance upon becoming collectable. As also described earlier, conversion of collectable elements may in practice include assigning a 'collectable' attribute to the appropriate game element(s).

The flow then progresses to a step S27, in which another determination is made as to whether the gameboard is settled. A described earlier, the flow progresses to this step, S27, upon determining at step S19 that no container element is broken.

If the gameboard is not determined to be settled at step S29, the flow continues back to step S13 of FIG. 11*a*.

Note that steps S23-S27 include determining if the gameboard is settled, converting elements to collectable elements, then determining if the gameboard is settled again. However, in some embodiments, conversion of a collectable element may not cause the gameboard to become unsettled. Therefore, in such embodiments, and when step S27 is reached via steps S23 and 25, step S27 may never progress back to step S13.

If the gameboard is determined to be settled at step S27, the flow continues to a step S29. At step S29, a determination is made as to whether the player has any game moves remaining. That is, a user may be allowed to provide a finite number of inputs indicating valid switch operations.

If it is determined at step S29 that the user has at least one move remaining, the flow returns to step S3 of FIG. 11*a*, wherein the gameboard is settled and a next user input is awaited.

If it is determined at step S29 that the user does not have at least one move remaining, the flow progresses to a step S31, in which the game level ends because the user is out of moves.

Element Collection

Collection of elements comprising the collectable attribute is now further described with reference to FIGS. 12*a* and 12*b*. For the purposes of the following description of FIGS. 12*a* and 12*b*, the same notation Txy as used previously will be used to denote a tile on the gameboard located x tiles from the left and y tiles down from the top.

Figure 12A:
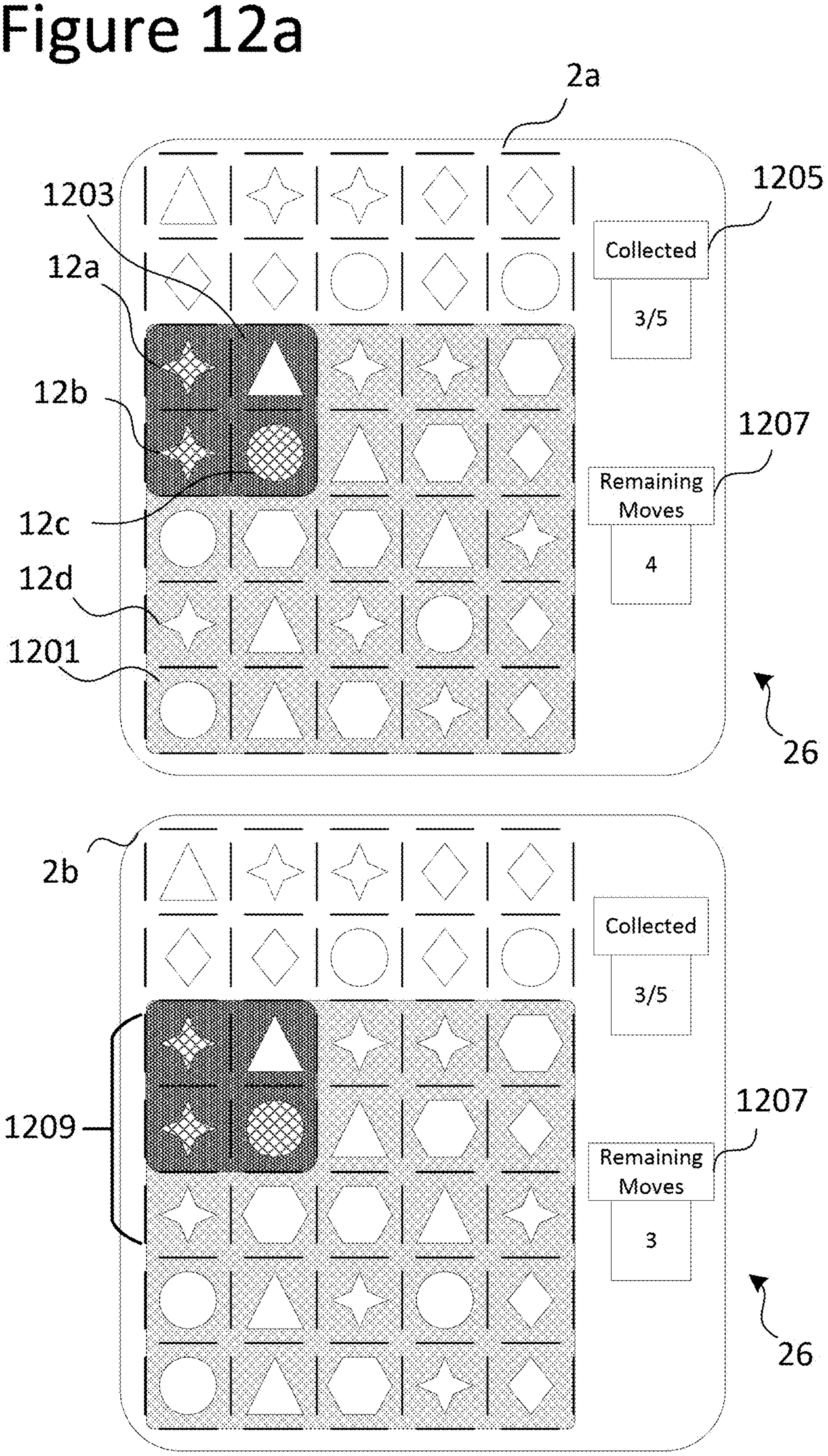
FIG. 12*a* shows highly schematic first and second views of an exemplary gameboard comprising game elements that include a collectable attribute.

FIG. 12*a* shows a two instances of an exemplary user interface 26 configured to provide a level of a game including features described herein. The particular embodiment represented in FIGS. 12*a* and 12*b* include allocation of a foam region before assignment of a collectable attribute. Again, it will be appreciated that in some embodiments, the removal of a container element causes direct allocation of the collectable attribute to one or more game element.

The first instance of the user interface 26 includes a first gameboard instance 2*a* comprising a grid of tiles, each tile supporting a game element 12. Each distinct shape of element 12 may be considered a different element type for the purpose of identifying element matches.

The first gameboard 2*a* comprises a soda region 1201 in accordance with the present description. The first gameboard 2*a* further comprises a foam region 1203 in accordance with some embodiments, whose features are also described herein. The foam region 1203 covers a 2×2 region of tiles within the soda region 1201, comprising tiles T13, T23, T14, and T24.

Three game elements 12*a*, 12*b*, 12*c* of the four elements in the foam region 1203, respectively located in tiles T13, T14, and T24, include the collectable attribute, as indicated by a cross-hatched texture shown on the game elements.

As previously described herein, if a match is made which comprises a collectable game element, that game element 12 may be removed and collected, causing incrementation of a counter configured to track a number of collected game elements. Such a counter may be displayed on the user interface 26. In the example of FIG. 12*a*, a collection counter 1205 displaying: "3/5" is shown. The value in the collection counter 1205 indicates that three collectable elements have already been collected (e.g., by previous element matches), and that a total of five collectable elements must be collected to satisfy a game objective associated with the game level.

A remaining moves counter 1207 is also shown, and displays a value '4'. This value may indicate that the player has four remaining opportunities to switch adjacent game elements, e.g., in order to satisfy match conditions and collect enough collectable game elements to satisfy the game objective.

A fourth exemplary game element, located in tile T16 is denoted 12*d* on the gameboard 2*a*. The fourth exemplary game element 12*d* is of a same element type as the collectable elements 12*a* and 12*b*. Further, the fourth element 12*d* may be switched with an adjacent element in tile T15 to satisfy a match-three condition, as seen in the second gameboard instance 2*b*. The second gameboard 2*b* shows the same game level as on gameboard 2*a*, but wherein a switch operation has been made to align elements 12*a*, 12*b*, and 12*d* to satisfy a match-three condition 1209. Since a user move has been made to switch elements T16 and T15, the value in the remaining moves counter 1207 has been decremented in the second gameboard 2*b*.

Figure 12B:
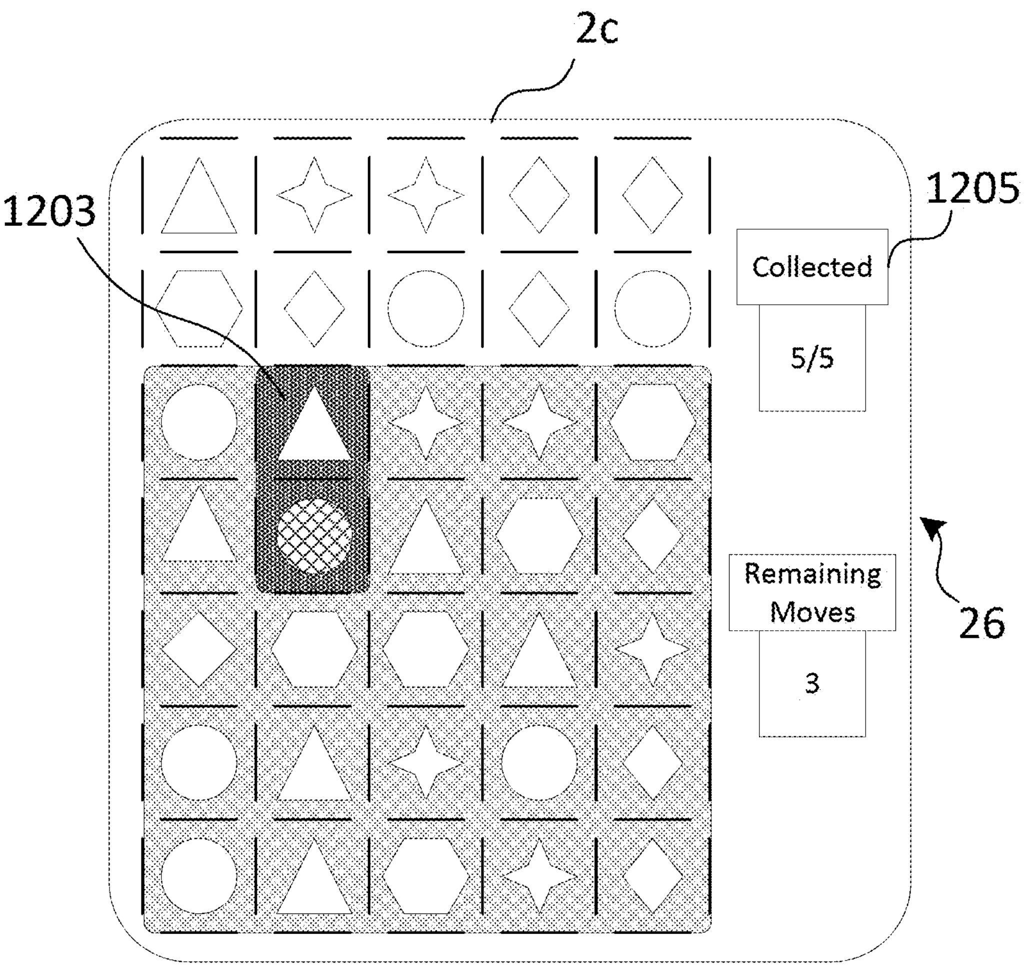
FIG. 12*b* shows a highly schematic third view of the same exemplary gameboard as in FIG. 12*a*, wherein the collectable game elements are collected.

Reference is now made to FIG. 12*b*, which shows a third instance of the same user interface 26 as is shown in FIG. 12*a*. In gameboard 2*c* of FIG. 12*b*, elements 12*a*, 12*b*, and 12*d* (of FIG. 12*a*) have been removed as a result of being included in a match 1209.

The match shown to be made in gameboard 2*b* of FIG. 12*a* included collectable elements 12*a* and 12*b*, which were located within the foam region 1203 when the match 1209 was made. As a result, in gameboard 2*c* of FIG. 12*b*, the three elements in the match 1209 have been removed, and the two collectable elements in the match 1209 have been collected, causing the collected element counter 1205 to correspondingly increment by two.

FIG. 12*b* shows an example in which the foam region 1203 changes in size by a factor of ½ each time a move is made. Therefore, on gameboard 12*c*, the foam region is shown to include only tiles T23 and T24.

It will be appreciated that in practice, visual animation effects may be displayed between the gameplay instances represented by gameboards 2*a*-2*c* of FIGS. 12*a* and 12*b*.

Further, the collection counter 1205 of FIG. 12*b* indicates that the required number of collected elements has been collected. FIG. 12*b* may therefore represent an instance in which the player has completed a game objective of the level. This may mean that the player has completed the level, though it will be appreciated that some game levels may comprise a plurality of level objectives.

Booster Elements

The game mechanics of above-mentioned booster elements are described below in a glossary which is intended as a non-exhaustive list of game elements.

Standard game elements: These are the six basic candies used for making switches and colour matches on the game board. Compared to special game elements, the standard game elements have no extra properties or behaviour, they are only used to make colour combinations or to create new special game elements.

Striped candy: A special candy with a line blast effect which means it removes one row or one column.

Line blast: An effect which removes one row or one column.

Bomb element: a candy in wrapped paper which removes candies in a 3×3 square area.

Wrapped candy: a candy in wrapped paper which removes candies in a 3×3 square area.

Colour Bomb: removes all candies of the colour with which it is being swapped.

Fish elements have a colour and must be included in a corresponding colour match to be activated. When activated, a quantity of other game elements of the same colour as the activated fish are removed from the gameboard.

Jelly cake is a blocker element that occupies a 2×2 region of tiles. The blocker is removed after a predetermined number of qualifying matches adjacent to the jelly cake. When jelly cake is destroyed, all removable game elements on the game board are activated (e.g., removed or decremented by 1 layer).

A striped hammer is a booster, but not a game element. A striped hammer is not rendered within a tile of a gameboard but is provided as an optional booster for the user outside of the gameboard. The user may expressly select to user the striped hammer and then select a tile on the gameboard. The striped hammer may apply damage to all elements on the same row as the selected tile, and all elements on the same column as the selected tile.

A supersonic lolly is a booster, but not a game element. A supersonic lolly is not rendered within a tile of a gameboard but is provided as an optional booster for the user outside of the gameboard. The user may expressly select to user the supersonic lolly and then select any tile on the gameboard. The supersonic lolly may then apply damage to all tiles on the gameboard.

We claim:

1. A computer device having:

a user interface comprising a display which is configured to display a gameboard of a computer game comprising a plurality of tiles, each tile supporting a respective user actuatable game element and a user input detection component configured to detect user input of a user move when a user engages with one of the user actuatable game elements, the display further configured to display a special game element on the gameboard;

a processor configured to receive the detected user input of the user move and to detect a first qualifying action affecting the special game element and to determine when a qualifying condition has been satisfied;

the processor further configured on determining that the qualifying condition has been satisfied to activate the special game element, wherein activating the special game element causes the processor to assign to at least one game element supported by a respective tile of the plurality of tiles a special element attribute which denotes the at least one game element with the assigned special element attribute as a collectable element;

the user input detection component further configured to detect a user input which satisfies a second qualifying action relating to the collectable element and wherein the processor is configured to increment a count for each collectable element to which the second qualifying action relates.

2. The computer device of claim 1 which comprises a computer store holding level data, wherein the tiles are arranged at gameboard locations defined in a gameboard layout in the level data.

3. The computer device of claim 1 wherein the gameboard comprises first and second regions, wherein first tiles of the first region have a first quality and second tiles of the second region have a second quality, wherein the special game element is activatable only in the first region and not in the second region.

4. The computer device of claim 3, wherein the processor is configured responsive to detected user input of the user move to detect a match game condition of at least three adjacent matching user actuatable game elements and to control the user interface to remove the at least three game elements from the display and provide on the display replacement user actuatable game elements, wherein different qualities of the first and second tiles define different physics with which the replacement user actuatable elements are provided on the display.

5. The computer device of claim 3, comprising a visual indicator which separates the first and second regions on the display.

6. The computer device of claim 3, wherein the processor is configured to render the special game element in the first region with a first visual appearance and a second special game element in the second region with a different visual appearance, the visual appearance indicating to the user that the first special game element in the first region is activatable, and the second game element in the second region is not activatable.

7. The computer device of claim 1 wherein the processor is configured responsive to the detected user input of the user move to detect a match game condition of at least three adjacent matching user actuatable game elements and to control the user interface to remove the at least three game elements from the display and provide on the display replacement user actuatable game elements.

8. The computer device of claim 7 wherein the processor is configured to detect the match game condition adjacent the special game element, and to determine the first qualifying action based on that detection.

9. The computer device of claim 7 wherein the processor is configured to detect the match game condition adjacent a collectable element and to determine the second qualifying action based on the detection.

10. The computer device of claim 1 wherein the processor is configured to detect an interacting event which is created by game code executed by the processor which generates a direct interaction with the special game element and to thereby determine the first qualifying action.

11. The computer device of claim 1 wherein the processor is configured to detect an interacting event which is created by game code executed by the processor which generates a direct interaction with the collectable element and to thereby determine the second qualifying action.

12. The computer device of claim 1, wherein the special game element comprises multiple layers and wherein the processor is configured to remove one layer for each first qualifying action, and to determine a qualifying condition where all layers have been removed.

13. The computer device of claim 12, wherein the processor is configured to render different visual indications of the special game element on removal of each layer.

14. The computer device of claim 1, wherein the processor is configured to allocate a special tile attribute to one or more tiles to form one or more special region, wherein each special region comprises one or more tile having the special tile attribute.

15. The computer device of claim 14, wherein the processor is configured to allocate the special tile attribute to the respective tile which supported the special game element which was activated by determination of the qualifying condition.

16. The computer device of claim 15, wherein the processor is configured to detect that the user input has switched a collectable element with an adjacent user actuatable game element to form a match game condition, and wherein the processor is configured to remove the special element attribute from the collectible element if it is no longer supported by a tile having the special tile attribute.

17. The computer device of claim 14, wherein the processor is configured to allocate the special tile attribute to multiple tiles when the special game element is activated, and wherein the processor is further configured to remove the special tile attribute from a subset of the number of tiles after a predetermined number of game moves by the user.

18. The computer device of claim 17, wherein the processor is configured to detect that one or more game element is no longer is supported by a tile having a special tile attribute and to remove the special element attribute from that one or more game element.

19. The computer device of claim 14, which comprises a computer store holding a data structure which holds tile data for each of the plurality of tiles supporting the game elements, the tile data indicating special tile attributes for the one or more tile, and game element data indicating the properties of the game elements and including the special element attribute assigned to the one or more game element.

20. The computer device of claim 19, which comprises a rendering engine configured to access the data structure to render tiles and game elements on a next gameboard after each user move.

21. The computer device of claim 1, wherein the processor is configured to detect that a game objective has been completed for a particular game level when the count assigned to the number of collectable elements reaches a predetermined count threshold.

22. A computer-implemented method of providing a computer game responsive to user inputs, the method comprising:

displaying a gameboard of a computer game comprising a plurality of tiles, each tile supporting a respective user actuatable game element;

receiving a detected user input of a user move when a user engages with one of the user actuatable game elements;

detecting a first qualifying action affecting a special game element on the gameboard;

in response to determining that a qualifying condition has been satisfied, activating the special game element, wherein activating the special game element causes assignment to at least one game element supported by a respective tile of the plurality of tiles a special element attribute, which denotes the at least one game element with the assigned special element attribute as a collectable element;

detecting a user input which satisfies a second qualifying action relating to the collectable element; and incrementing a count for each collectable element to which the second qualifying action relates.

23. A non-transitory computer-readable medium on which are stored computer readable instructions which when executed by a processor of a computer device cause the processor to implement a method comprising:

displaying a gameboard of a computer game comprising a plurality of tiles, each tile supporting a respective user actuatable game element;

receiving a detected user input of a user move when a user engages with one of the user actuatable game elements;

detecting a first qualifying action affecting a special game element on the gameboard;

in response to determining that a qualifying condition has been satisfied, activating the special game element, wherein activating the special game element causes assignment to at least one game element supported by a respective tile of the plurality of tiles the at least one tile a special element attribute, which denotes the at least one game element with the assigned special element attribute as a collectable element;

detecting a user input which satisfies a second qualifying action relating to the collectable element; and incrementing a count for each collectable element to which the second qualifying action relates.

* * * * *